United States Patent
Zhao

(10) Patent No.: US 10,595,340 B2
(45) Date of Patent: Mar. 17, 2020

(54) INFORMATION TRANSMISSION METHOD AND APPARATUS IN CELL

(71) Applicant: Huawei Technologies Co., Ltd., Shenzhen, Guangdong (CN)

(72) Inventor: Zhenshan Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/629,537

(22) Filed: Jun. 21, 2017

(65) Prior Publication Data

US 2017/0290054 A1    Oct. 5, 2017

Related U.S. Application Data

(63) Continuation of application No. PCT/CN2015/097356, filed on Dec. 15, 2015.

(30) Foreign Application Priority Data

Dec. 22, 2014 (CN) .......................... 2014 1 0803232

(51) Int. Cl.
*H04W 4/00* (2018.01)
*H04W 74/02* (2009.01)
(Continued)

(52) U.S. Cl.
CPC .......... *H04W 74/02* (2013.01); *H04B 17/327* (2015.01); *H04W 28/10* (2013.01);
(Continued)

(58) Field of Classification Search
None
See application file for complete search history.

(56) References Cited

U.S. PATENT DOCUMENTS 6,754,176 B1 * 6/2004 Gubbi .................. H04L 12/462
370/230
7,310,679 B1   12/2007 Doyle
(Continued)

FOREIGN PATENT DOCUMENTS

| CN | 101316436 A | 12/2008 |
| CN | 101801034 A | 8/2010 |
| CN | 102905324 A | 1/2013 |

OTHER PUBLICATIONS

Samsung; "Direct Discovery Resource Allocation"; 3GPP TSG RAN WG2 Meeting #85; R2-140192; Prague, Czech Republic; Feb. 10-14, 2014; 6 pages.
(Continued)

*Primary Examiner* — Bob A Phunkulh
(74) *Attorney, Agent, or Firm* — Leydig, Voit & Mayer, Ltd.

(57) ABSTRACT

Embodiments of the present disclosure relate to the field of wireless communications technologies, and disclose an information transmission method and apparatus in a cell, so as to improve information transmission efficiency of a wireless network. The method of the present disclosure includes: obtaining, by a network device, terminal information, where the terminal information includes: a movement speed of the terminal, and/or a location of the terminal in the cell; determining, by the network device, a state of the terminal according to the terminal information, where the state of the terminal includes: a first state or a second state; and when the terminal is in the first state, performing, by the terminal, communication on a contention resource of the cell; and when the terminal is in the second state, allocating, by the network device, a contention-free resource of the cell to the terminal.

4 Claims, 16 Drawing Sheets

(51) Int. Cl.
*H04W 28/10* (2009.01)
*H04W 72/04* (2009.01)
*H04B 17/327* (2015.01)
*H04W 64/00* (2009.01)
*H04W 74/00* (2009.01)
*H04W 76/27* (2018.01)
*H04W 74/08* (2009.01)

(52) U.S. Cl.
CPC ....... *H04W 64/006* (2013.01); *H04W 72/048* (2013.01); *H04W 74/006* (2013.01); *H04W 74/08* (2013.01); *H04W 76/27* (2018.02)

(56) References Cited

U.S. PATENT DOCUMENTS

| | | | | |
|---|---|---|---|---|
| 9,137,827 | B1* | 9/2015 | Marupaduga | H04W 72/04 |
| 9,307,474 | B1* | 4/2016 | Tailor | H04W 36/30 |
| 2003/0174690 | A1* | 9/2003 | Benveniste | H04W 74/02 |
| | | | | 370/350 |
| 2008/0026758 | A1* | 1/2008 | Murakami | H04W 4/023 |
| | | | | 455/436 |
| 2008/0316961 | A1 | 12/2008 | Bertrand et al. | |
| 2009/0034552 | A1* | 2/2009 | Yonge, III | H04L 12/2801 |
| | | | | 370/458 |
| 2012/0134288 | A1* | 5/2012 | Fang | G01S 5/0205 |
| | | | | 370/252 |
| 2013/0028184 | A1* | 1/2013 | Lee | H04W 8/22 |
| | | | | 370/328 |
| 2013/0088983 | A1* | 4/2013 | Pragada | H04W 16/14 |
| | | | | 370/252 |
| 2013/0215860 | A1* | 8/2013 | Cho | H04B 7/026 |
| | | | | 370/329 |
| 2013/0230028 | A1* | 9/2013 | Calcev | H04W 72/1231 |
| | | | | 370/336 |
| 2013/0301541 | A1* | 11/2013 | Mukherjee | H04W 74/0833 |
| | | | | 370/329 |
| 2013/0326137 | A1* | 12/2013 | Bilange | G06F 12/0866 |
| | | | | 711/113 |
| 2014/0141785 | A1 | 5/2014 | Wang et al. | |
| 2014/0171083 | A1* | 6/2014 | Zhang | H04W 36/32 |
| | | | | 455/436 |
| 2014/0219204 | A1* | 8/2014 | Park | H04L 1/1822 |
| | | | | 370/329 |
| 2015/0071261 | A1* | 3/2015 | Lee | H04W 56/0045 |
| | | | | 370/336 |
| 2015/0131581 | A1* | 5/2015 | Wei | H04W 72/0453 |
| | | | | 370/329 |
| 2015/0141019 | A1* | 5/2015 | Bengtsson | H04W 28/08 |
| | | | | 455/440 |
| 2015/0148067 | A1* | 5/2015 | Ying | H04W 64/00 |
| | | | | 455/456.1 |
| 2015/0312869 | A1* | 10/2015 | Lee | H04W 56/0045 |
| | | | | 370/329 |
| 2015/0358890 | A1* | 12/2015 | Xu | H04W 48/16 |
| | | | | 455/437 |
| 2016/0255580 | A1* | 9/2016 | Onaka | H04W 48/00 |
| | | | | 370/311 |

OTHER PUBLICATIONS

IEEE; "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Amendment 6: Wireless Access in Vehicular Environments"; IEEE Computer Society, Jul. 15, 2010; 51 pages.

Institute for Information Industry (III), "Integrated resource scheduling for in-coverage D2D communication to support Mode 1 and Mode 2", 3GPP TSG RAN WG1 Meeting #76bis, Shenzhen, China, Mar. 31-Apr. 4, 2014, 6 pages, R1-141499.

Samsung, "Direct Discovery Resource Allocation", 3GPP TSG RAN WG2 Meeting #83-bis, Ljubljana, Slovenia, Oct. 7-11, 2013, 3 pp., R2-133214.

* cited by examiner

INFORMATION TRANSMISSION METHOD AND APPARATUS IN CELL

CROSS-REFERENCE TO RELATED APPLICATIONS

This application is a continuation of International Application No. PCT/CN2015/097356, filed on Dec. 15, 2015, which claims priority to Chinese Patent Application No. 201410803232.0, filed on Dec. 22, 2014, the disclosures of the aforementioned applications are hereby incorporated by reference in their entireties.

TECHNICAL FIELD

The present application relates to the field of wireless communications technologies, and in particular, to an information transmission method and apparatus in a cell.

BACKGROUND

Currently, before performing communication, a terminal in a wireless network needs to first access a cell in which the terminal is currently located, and requests the cell to allocate a network resource. The terminal generally requests, in a signaling exchange manner, to obtain the network resource from a base station, so that the terminal performs communication on the obtained network resource. Signaling that is exchanged between the terminal and the base station and that is used to request the network resource occupies bandwidths of the wireless network. When the terminal moves from one cell to another cell, a series of signaling exchange procedures need to be executed between the terminal and the base station and between a source base station and a target base station, to complete a cell handover and obtain a resource of the another cell. However, the signaling exchange procedures are quite complex.

When a terminal is an in-vehicle terminal device, or a user who holds a terminal is in a vehicle, usually because a movement speed of the terminal in a cell is fast, and as a result, the terminal frequently shuttles between multiple cells, the terminal needs to frequently execute the foregoing signaling exchange procedures used for a cell handover, to adjust a network resource used when the terminal performs communication. Consequently, a large quantity of network bandwidths are occupied, and information transmission efficiency of a wireless network is reduced.

SUMMARY

Embodiments of the present disclosure provide an information transmission method and apparatus in a cell, so as to improve information transmission efficiency of a wireless network.

To achieve the foregoing objective, the following technical solutions are used in the embodiments of the present disclosure.

According to a first aspect, an embodiment of the present disclosure provides an information transmission method in a cell, where the method is applied to a wireless network, the wireless network includes at least a network device and a terminal, the terminal is located in a cell of the network device, and the method includes:

obtaining, by the network device, terminal information, where the terminal information includes: a movement speed of the terminal, and/or a location of the terminal in the cell;

determining, by the network device, a state of the terminal according to the terminal information, where the state of the terminal includes: a first state or a second state; and when the terminal is in the first state, performing, by the terminal, communication on a contention resource of the cell; and when the terminal is in the second state, allocating, by the network device, a contention-free resource of the cell to the terminal.

With reference to first aspect, in a first possible implementation manner of the first aspect, the determining, by the network device, a state of the terminal according to the terminal information includes:

detecting, by the network device, whether the movement speed of the terminal is greater than a speed threshold, and if the movement speed of the terminal is greater than the speed threshold, determining that the terminal enters the first state; and if the movement speed of the terminal is less than or equal to the speed threshold, determining that the terminal enters the second state.

With reference to the first aspect, in a second possible implementation manner of the first aspect, the determining, by the network device, a state of the terminal according to the terminal information includes:

determining, by the network device according to the location of the terminal in the cell, whether the terminal is located in a specified region in the cell; and if the terminal is located in the specified region, determining that the terminal enters the first state, and if the terminal is not located in the specified region, determining that the terminal enters the second state.

With reference to the second possible implementation manner of the first aspect, in a third possible implementation manner of the first aspect, the terminal information further includes a movement direction of the terminal; and the determining, by the network device, a state of the terminal according to the terminal information includes:

when it is determined that the terminal is located in the specified region, determining, by the network device according to the movement direction, whether the terminal moves away from a center of the cell; and if the terminal moves away from the center of the cell, determining that the terminal enters the first state, and if the terminal does not move away from the center of the cell, determining that the terminal enters the second state.

According to a second aspect, an embodiment of the present disclosure provides an information transmission method in a cell, where the method is applied to a wireless network, the wireless network includes at least a network device and a terminal, the terminal is located in a cell of the network device, and the method includes:

receiving, by the terminal, a signal sent by the network device, where the signal sent by the network device includes at least threshold information;

obtaining, by the terminal, terminal information, where the terminal information includes at least a movement speed of the terminal, and/or the terminal information is used to represent a transmission state of uplink data of the terminal;

determining, by the terminal, a state of the terminal according to the terminal information and the signal sent by the network device, where the state of the terminal includes: a first state or a second state; and when the terminal is in the first state, performing, by the terminal, communication on a contention resource of the cell; and when the terminal is in the second state, requesting, by the terminal, a contention-free resource of the cell from the network device.

With reference to the second aspect, in a first possible implementation manner of the second aspect, the threshold information is used to represent a speed threshold, and the determining, by the terminal, a state of the terminal according to the terminal information and the signal sent by the network device includes:

detecting, by the terminal, whether the movement speed is greater than the speed threshold, and if the movement speed is greater than the speed threshold, determining that the terminal enters the first state; and if the movement speed of the terminal is less than or equal to the speed threshold, determining that the terminal enters the second state.

With reference to the second aspect, in a second possible implementation manner of the second aspect, the obtaining, by the terminal, terminal information includes: performing, by the terminal, physical layer measurement, and obtaining a physical layer parameter, where the physical layer parameter includes at least reference signal received quality RSRQ and/or reference signal received power RSRP; and the determining, by the terminal, a state of the terminal according to the terminal information and the signal sent by the network device includes: comparing, by the terminal, the physical layer parameter with a physical layer parameter threshold, and determining whether the terminal is uplink-limited, where the threshold information is further used to represent the physical layer parameter threshold; and if the terminal is uplink-limited, determining that the terminal enters the first state, and if the terminal is non-uplink-limited, determining that the terminal enters the second state.

With reference to any one of the second aspect, or the first to the second possible implementation manners of the second aspect, in a third possible implementation manner of the second aspect, the receiving, by the terminal, a signal sent by the network device includes:

receiving, by the terminal, terminal information broadcast by the network device; or receiving, by the terminal, control signaling that includes the terminal information and that is sent by the network device.

According to a third aspect, an embodiment of the present disclosure provides an information transmission apparatus in a cell, where the apparatus is applied to a wireless network, the wireless network includes at least a network device and a terminal, the terminal is located in a cell of the network device, and the apparatus includes:

an obtaining module, configured to obtain terminal information, where the terminal information includes: a movement speed of the terminal, and/or a location of the terminal in the cell; and a determining module, configured to determine a state of the terminal according to the terminal information obtained by the obtaining module, where the state of the terminal includes: a first state or a second state, where when the terminal is in the first state, the terminal performs communication on a contention resource of the cell; and when the terminal is in the second state, the network device allocates a contention-free resource of the cell to the terminal.

With reference to the third aspect, in a first possible implementation manner of the third aspect, the determining module is specifically configured to:

detect whether the movement speed of the terminal obtained by the obtaining module is greater than a speed threshold, and if the movement speed of the terminal is greater than the speed threshold, determine that the terminal enters the first state; and if the movement speed of the terminal is less than or equal to the speed threshold, determine that the terminal enters the second state.

With reference to the third aspect, in a second possible implementation manner of the third aspect, the determining module is further specifically configured to:

determine, according to the location of the terminal in the cell obtained by the obtaining module, whether the terminal is located in a specified region in the cell; and if the terminal is located in the specified region, determine that the terminal enters the first state, and if the terminal is not located in the specified region, determine that the terminal enters the second state.

With reference to the second possible implementation manner of the third aspect, in a third possible implementation manner of the third aspect, the terminal information further includes a movement direction of the terminal; and the determining module is further specifically configured to:

when it is determined that the terminal is located in the specified region, determine, according to the movement direction obtained by the obtaining module, whether the terminal moves away from a center of the cell; and if the terminal moves away from the center of the cell, determine that the terminal enters the first state, and if the terminal does not move away from the center of the cell, determine that the terminal enters the second state.

According to a fourth aspect, an embodiment of the present disclosure provides an information transmission apparatus in a cell, where the apparatus is applied to a wireless network, the wireless network includes at least a network device and a terminal, the terminal is located in a cell of the network device, and the apparatus includes:

a receiving module, configured to receive a signal sent by the network device, where the signal sent by the network device includes at least threshold information;

an obtaining module, configured to obtain terminal information, where the terminal information includes at least a movement speed of the terminal, and/or the terminal information is used to represent a transmission status of uplink data of the terminal; and a determining module, configured to determine a state of the terminal according to the terminal information obtained by the obtaining module and the signal sent by the network device, where the state of the terminal includes: a first state or a second state, where when the terminal is in the first state, the terminal performs communication on a contention resource of the cell; and when the terminal is in the second state, requests a contention-free resource of the cell from the network device.

With reference to the fourth aspect, in a first possible implementation manner of the fourth aspect, the threshold information is used to represent a speed threshold, and the determining module is specifically configured to:

detect whether the movement speed obtained by the obtaining module is greater than the speed threshold, and if the movement speed is greater than the speed threshold, determine that the terminal enters the first state; and if the movement speed of the terminal is less than or equal to the speed threshold, determine that the terminal enters the second state.

With reference to the fourth aspect, in a second possible implementation manner of the fourth aspect, the obtaining module is specifically configured to:

perform physical layer measurement, and obtain a physical layer parameter, where the physical layer parameter includes at least reference signal received quality RSRQ and/or reference signal received power RSRP; and the determining module is further specifically configured to:

compare the physical layer parameter obtained by the obtaining module with a physical layer parameter threshold, and determine whether the terminal is uplink-limited, where the threshold information is further used to represent the physical layer parameter threshold; and if the terminal is uplink-limited, determine that the terminal enters the first state, and if the terminal is non-uplink-limited, determine that the terminal enters the second state.

With reference to any one of the fourth aspect, or the first to the second possible implementation manners of the fourth aspect, in a third possible implementation manner of the fourth aspect, the receiving module is specifically configured to:

receive terminal information broadcast by the network device; or receive control signaling that includes the terminal information and that is sent by the network device.

According to the information transmission method and apparatus in a cell provided in the embodiments of the present disclosure, a network device determines a state of a terminal according to obtained terminal information in the cell, or a terminal determines a state of the terminal according to a received signal sent by a network device, and obtained terminal information, and adjusts, according to the state of the terminal, a network resource used when the terminal performs communication. Compared with a solution in the prior art that a terminal frequently executes a cell handover due to fast movement between cells, to adjust a network resource used when the terminal performs communication, in the present disclosure, the network device may determine the state of the terminal according to the obtained terminal information, or the terminal may determine the state of the terminal according to the received signal sent by the network device, and the obtained terminal information, and adjust the network resource used when the terminal performs communication. Therefore, when a movement speed of the terminal in the cell is fast, and as a result, the terminal frequently shuttles between multiple cells, the network device or the terminal determines the state of the terminal, to adjust the network resource used when the terminal performs communication, thereby avoiding occupation of a large quantity of network bandwidths, and improving information transmission efficiency of a wireless network.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The terms used in the embodiments of the present disclosure are merely for the purpose of illustrating specific embodiments, and are not intended to limit the present disclosure. The terms "a", "said" and "the" of singular forms used in the embodiments and the appended claims of the present disclosure are also intended to include plural forms, unless otherwise specified in the context clearly. It should also be understood that, the term "and/or" used herein indicates and includes any or all possible combinations of one or more associated listed items.

An embodiment of the present disclosure may be applied to a wireless network, where the wireless network includes at least a network device and a terminal, the terminal is located in a cell of the network device, the network device may be specifically a base station, and a terminal device may be specifically a PAD, a smartphone, an in-vehicle terminal or the like.

Figure 1:
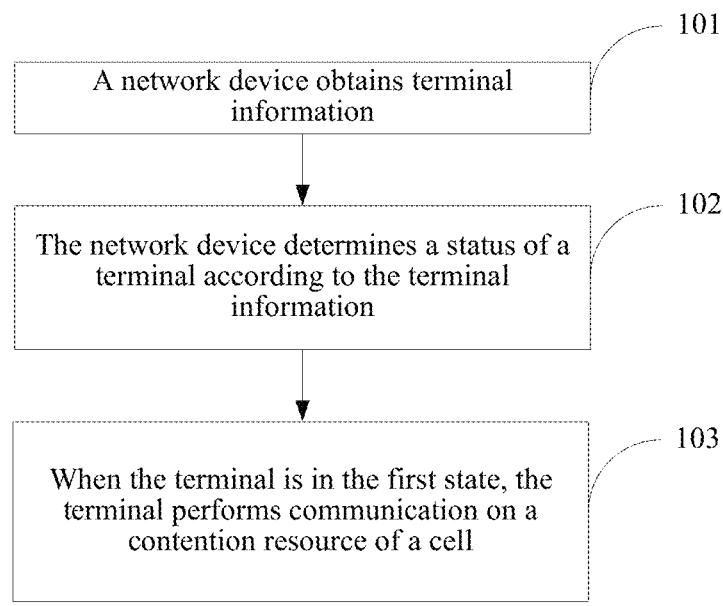
FIG. 1 is a flowchart of an information transmission method in a cell according to an embodiment of the present disclosure.
Figure 1A:
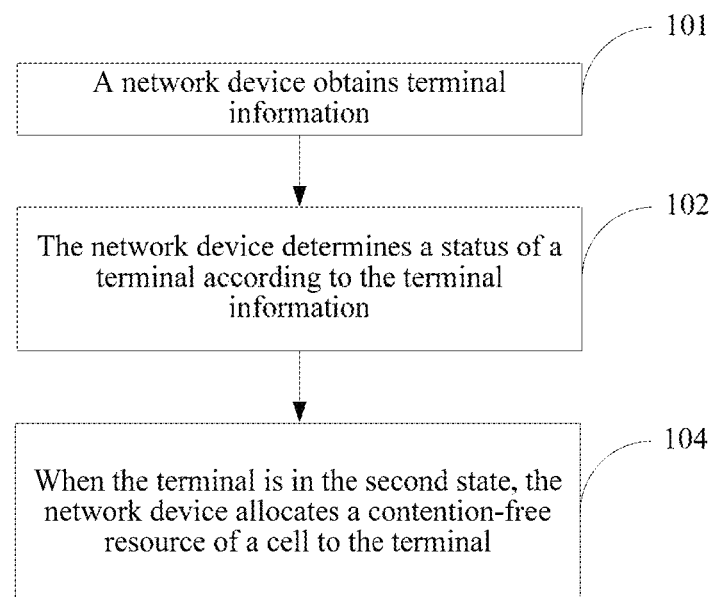
FIG. 1a is a flowchart of another information transmission method in a cell according to an embodiment of the present disclosure.

This embodiment of the present disclosure provides an information transmission method in a cell. As shown in FIG. 1 or FIG. 1a, the method includes the following steps.

101. The network device obtains terminal information.

The terminal information includes: a movement speed of the terminal, and/or a location of the terminal in the cell.

Using an in-vehicle terminal device as an example, a base station may estimate a movement speed of the in-vehicle terminal device according to an uplink reference signal, or the in-vehicle terminal device estimates a movement speed according to a downlink reference signal, and sends the movement speed to a base station by using signaling, so that the base station obtains the movement speed of the in-vehicle terminal device. It should be noted that, the terminal information may further include parameters such as a location and a movement direction of the terminal, or other parameters that may be used to determine whether the terminal moves from one cell to another cell within a short time. When the terminal does not move from one cell to another cell within a short time, it indicates that the terminal remains in one cell within a short time, and a cell handover does not easily occur. Therefore, the network device may allocate a contention-free resource to the terminal, so that the terminal performs communication on the contention-free resource of the cell. When the terminal moves from one cell to another cell within a short time, it indicates that the terminal cannot remain in one cell within a short time, and a cell handover easily occurs. Therefore, the network device does not allocate a contention-free resource to the terminal, so that the terminal may perform communication on a contention resource of the cell.

The network device may further request to obtain a current location of the terminal from the terminal. The terminal may obtain the current location in multiple specific manners, for example: the terminal performs positioning by using a navigation device or by using a sensor that the terminal is provided with and obtains a current location parameter of the terminal. Then the location parameter is added to the terminal information and reported to the network device, and then the network device determines, according to the current location parameter reported by the terminal, that is, the location of the terminal in the cell, whether the terminal is located in a specified region in the cell.

In this embodiment of the present disclosure, the terminal information may include at least parameters used to represent a movement state of the terminal, such as the movement speed of the terminal and the location of the terminal in the cell. The network device analyzes how the terminal moves according to an obtained parameter that represents a movement state of the terminal, and determines whether the terminal easily leaves the cell. If the terminal easily leaves the cell, the state of the terminal is determined as a first state; and if the terminal does not easily leave the cell, the state of the terminal is determined as a second state.

102. The network device determines a state of the terminal according to the terminal information.

The state of the terminal includes: a first state or a second state.

103. When the terminal is in the first state, the terminal performs communication on a contention resource of the cell.

104. When the terminal is in the second state, the network device allocates a contention-free resource of the cell to the terminal.

It should be noted that, after 102 is performed, 103 or 104 may be performed.

Figure 2:
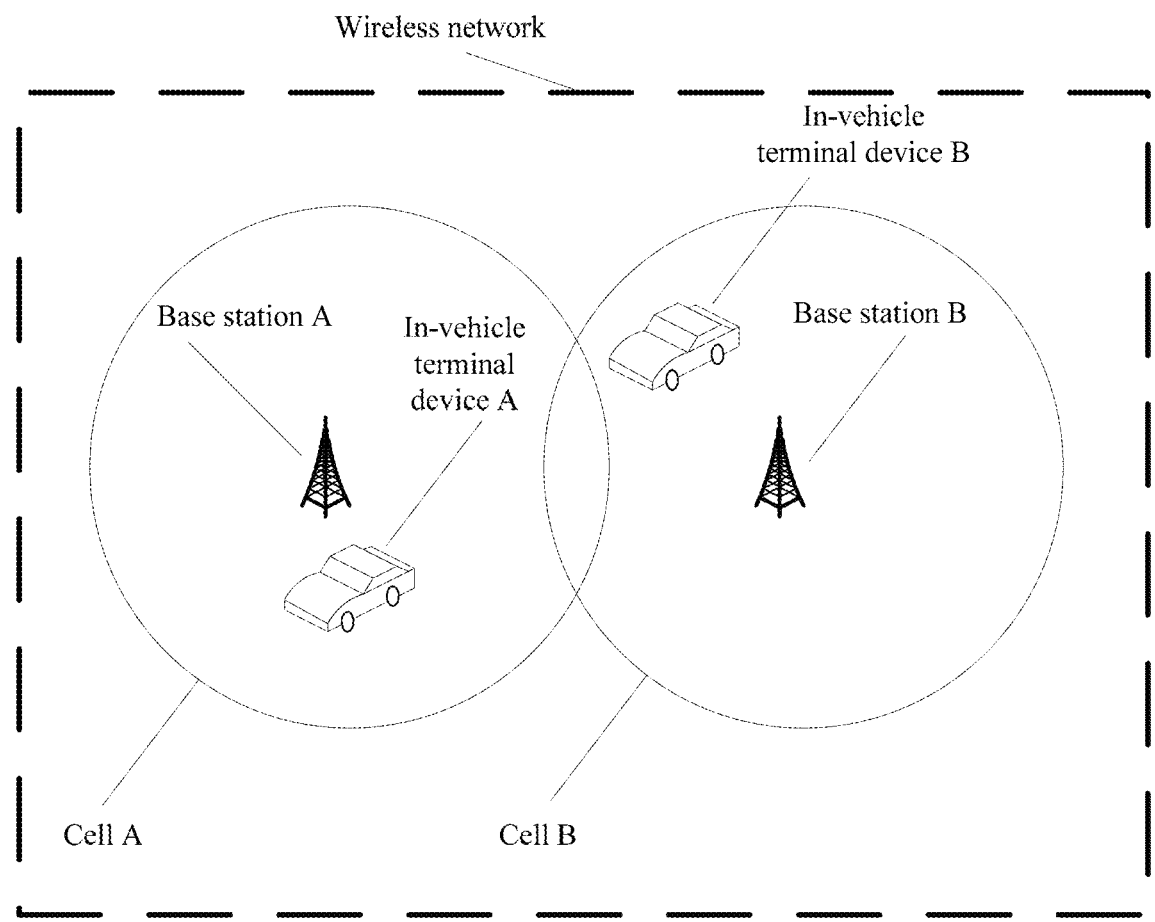
FIG. 2 is a schematic diagram of a specific application scenario according to an embodiment of the present disclosure.

In this embodiment of the present disclosure, the first state may be an idle state, and the second state may be a connected state. For example: a base station A and a base station B are disposed in a wireless network shown in FIG. 2, and the terminal may be an in-vehicle terminal device A and an in-vehicle terminal device B. The network device serves as an execution body, the base station A and the in-vehicle terminal device A are located in a cell A, and the base station B and the in-vehicle terminal device B are located in a cell B. If the in-vehicle terminal device A is in an idle state, when the in-vehicle terminal device A in the idle state moves between the cell A and the cell B, processes of a cell selection and a cell reselection are performed. A main process is that the in-vehicle terminal device A performs physical layer measurement, selects one cell with a strongest signal from the cell A and cell B, and camps on the cell, and the in-vehicle terminal device A obtains a resource from a contention resource of the cell in a contention manner, to perform communication from the in-vehicle terminal device A to another terminal. If the in-vehicle terminal device B is in a connected state, when the in-vehicle terminal device B in the connected state moves between the cell A and the cell B, an inter-cell handover is performed, and the base station allocates a contention-free resource of the cell on the contention-free resource of the cell to the in-vehicle terminal device B, to ensure communication from the in-vehicle terminal device B to another terminal.

Figure 3:
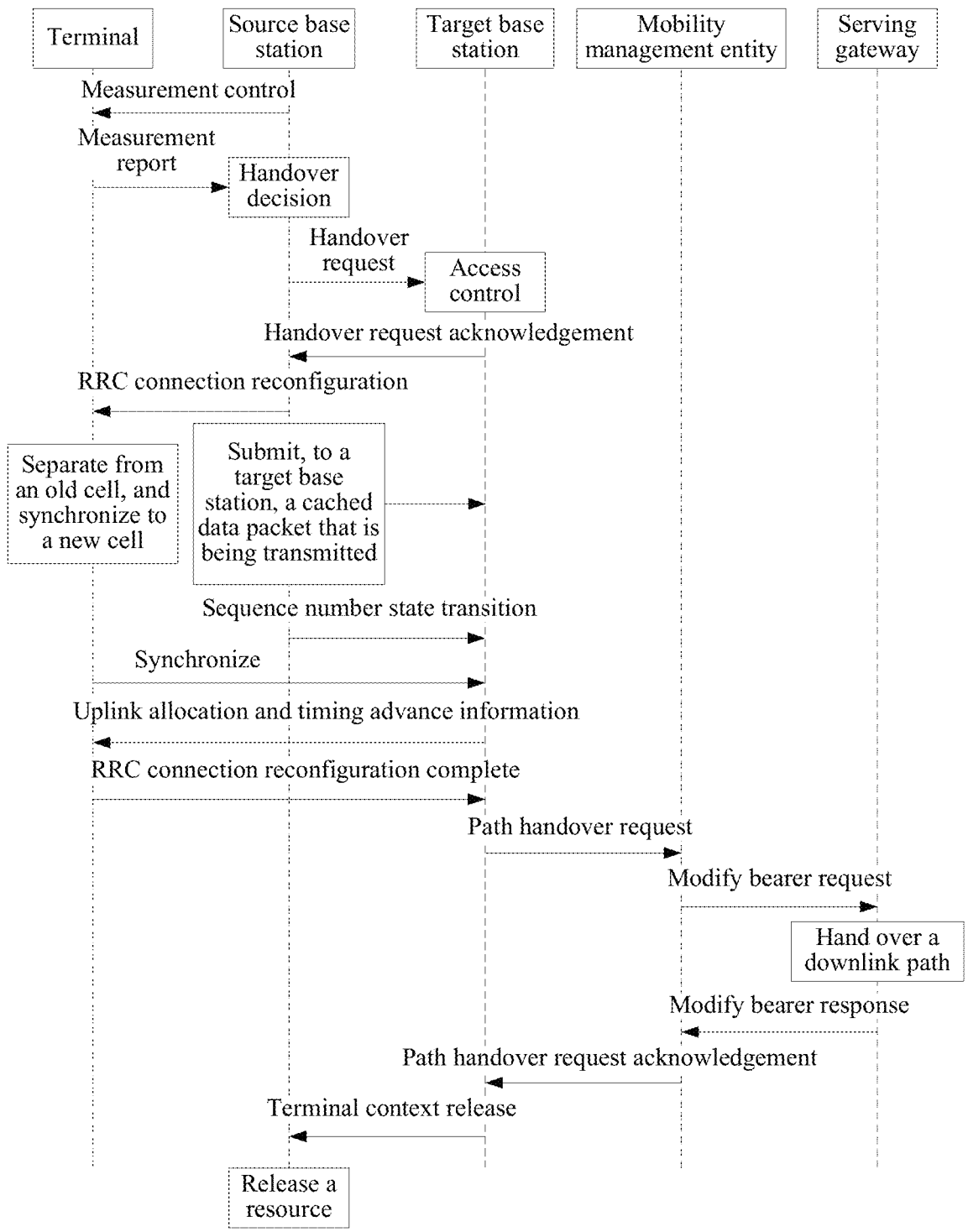
FIG. 3 is a flowchart of information exchange in a specific application scenario in the prior art.

For example, a specific signaling exchange procedure is roughly shown in FIG. 3: A source base station performs measurement control on a terminal; the terminal sends a measurement report to the source base station; the source base station performs a handover decision according to the measurement report sent by the terminal, and sends a handover request to a target base station; the target base station performs access control, and sends handover request acknowledgement signaling to the source base station; the source base station sends radio resource control (RRC) connection reconfiguration signaling to the terminal; the terminal separates from an old cell, and synchronizes to a new cell; the source base station submits, to the target base station, a cached data packet that is being transmitted; the source base station performs sequence number state transition; the terminal synchronizes to the target base station; the target base station sends uplink allocation and timing advance information signaling to the terminal; the terminal sends RRC connection reconfiguration complete signaling to the target base station; the target base station sends a path handover request to a mobility management entity; the mobility management entity sends a modify bearer request to a serving gateway; the serving gateway hands over a downlink path, and sends modify bearer response signaling to the mobility management entity; the mobility management entity sends path handover request acknowledgement signaling to the target base station; the target base station sends terminal context release signaling to the source base station; and the source base station releases a resource, thereby completing a cell handover.

Therefore, as can be seen, an existing handover process is quite complex, and due to fast movement of the terminal, the handover process is executed frequently, the complex handover process is repeated for multiple times, and signaling exchange overheads are excessively large. For example, because the movement speed is fast, and the terminal leaves the cell without effectively using a network resource of the current cell, the terminal further needs to perform a handover again.

According to the information transmission method in a cell provided in this embodiment of the present disclosure, the network device determines a state of a terminal according to obtained terminal information in the cell, and adjusts, according to the state of the terminal, a network resource used when the terminal performs communication. Compared with that in the prior art the terminal frequently executes a cell handover due to fast movement between cells, to adjust a network resource used when the terminal performs communication, in the present disclosure, the network device may determine a state of the terminal according to obtained terminal information, and adjust a network resource used when the terminal performs communication. Therefore, when a movement speed of the terminal in the cell is fast, and as a result, the terminal frequently shuttles between multiple cells, the network device determines the state of the terminal, to adjust the network resource used when the terminal performs communication, thereby avoiding occupation of a large quantity of network bandwidths, and improving information transmission efficiency of a wireless network.

Figure 4:
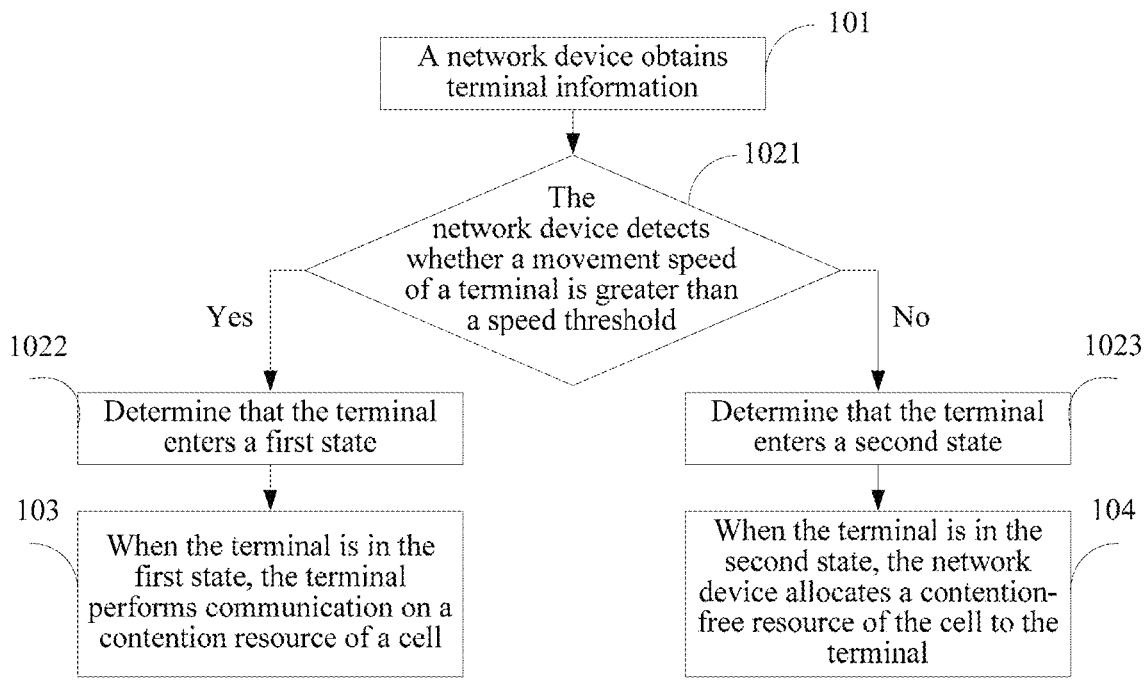
FIG. 4 is a flowchart of another information transmission method in a cell according to an embodiment of the present disclosure.

In this embodiment of the present disclosure, the network device may determine the state of the terminal by detecting whether the movement speed of the terminal is greater than a speed threshold. Therefore, on the basis of the implementation manner shown in FIG. 1 or FIG. 1a, 102 may be implemented as 1021 to 1023 shown in FIG. 4:

1021. The network device detects whether a movement speed of the terminal is greater than a speed threshold.

1022. If the network device detects that the movement speed of the terminal is greater than the speed threshold, determine that the terminal enters the first state.

1023. If the network device detects that the movement speed of the terminal is less than or equal to the speed threshold, determine that the terminal enters the second state.

In this embodiment of the present disclosure, the base station determines a state of the in-vehicle terminal device by detecting whether the movement speed of the in-vehicle terminal device is greater than the speed threshold.

If the base station detects that the movement speed of the in-vehicle terminal device is greater than the speed threshold, it is determined that the in-vehicle terminal device enters an idle state; and if the base station detects that the movement speed of the in-vehicle terminal device is less than or equal to the speed threshold, it is determined that the in-vehicle terminal device enters a connected state.

It should be noted that, each network device has a speed threshold, the speed threshold may be preset in a cell optimization process, or may be dynamically or semi-statically adjusted according to terminal characteristics in the cell, and for different network devices, the speed thresholds may be the same or may be different.

Figure 4A:
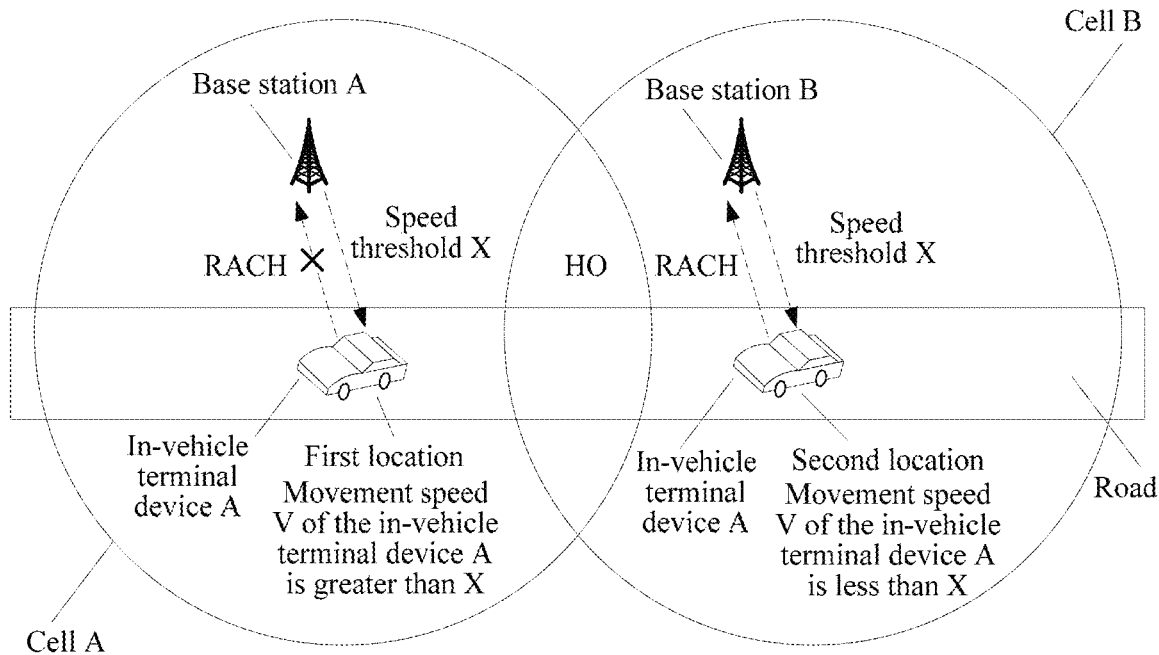
FIG. 4a is a schematic diagram of another specific application scenario according to an embodiment of the present disclosure.

For example: as shown in FIG. 4a, if an in-vehicle terminal device A travels along a road, when the in-vehicle terminal device A is at a first location in a cell A, a base station A broadcasts a speed threshold X, and a movement speed V of the in-vehicle terminal device A is greater than the speed threshold X, it is determined that the in-vehicle terminal device A enters an idle state in this case, and the in-vehicle terminal device A does not need to trigger a random access (RA) process to access the cell; and when the in-vehicle terminal device A is at a second location in a cell B, a base station B broadcasts a speed threshold X, and a movement speed V of the in-vehicle terminal device A is less than the speed threshold X, it is determined that the in-vehicle terminal device A enters a connected state in this case, and the in-vehicle terminal device A needs to initiate a random access process to access the cell.

According to the information transmission method in a cell provided in this embodiment of the present disclosure, a network device determines a state of a terminal in the cell according to an obtained movement speed of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine the state of the terminal according to a magnitude relationship between the obtained movement speed of the terminal and a speed threshold, and adjust the network resource used when the terminal performs communication. Therefore, when the movement speed of the terminal in the cell is fast, and as a result, the terminal frequently shuttles between multiple cells, the network device determines the state of the terminal according to a magnitude relationship between the movement speed of the terminal and the speed threshold, to adjust the network resource used when the terminal performs communication, thereby avoiding occupation of a large quantity of network bandwidths, and improving information transmission efficiency of a wireless network.

Figure 5:
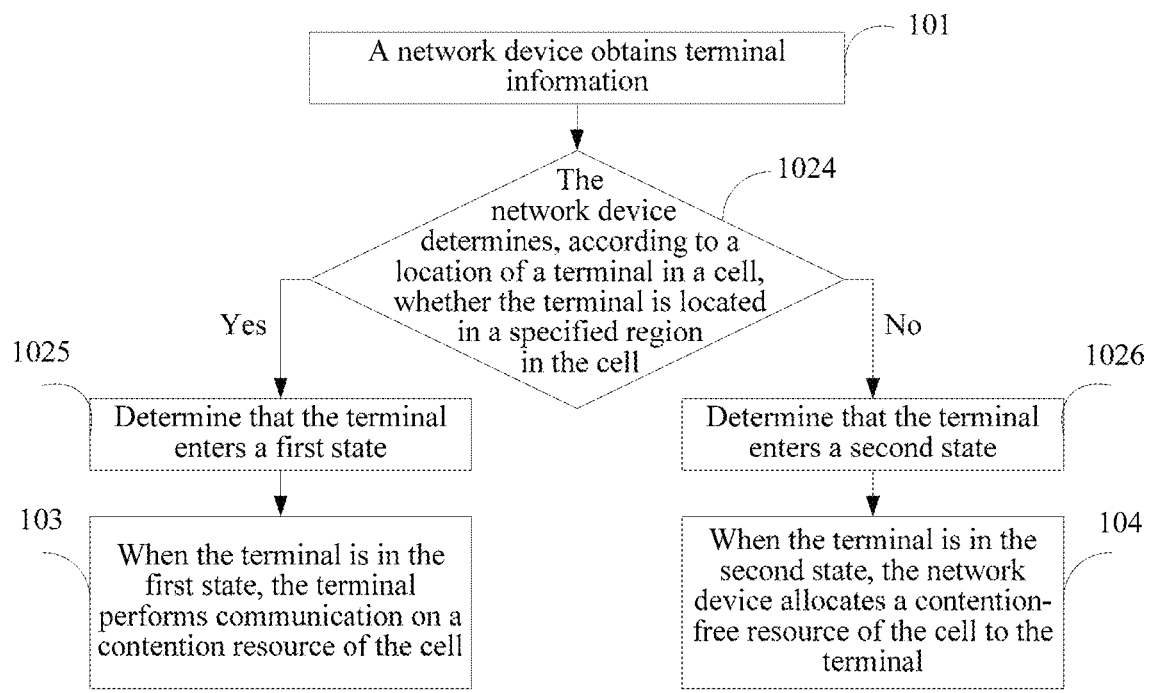
FIG. 5 is a flowchart of another information transmission method in a cell according to an embodiment of the present disclosure.

In this embodiment of the present disclosure, the network device may determine the state of the terminal according to the location of the terminal in the cell. Therefore, on the basis of the implementation manner shown in FIG. 1 or FIG. 1a, 102 may be implemented as 1024 to 1026 shown in FIG. 5:

1024. The network device determines, according to the location of the terminal in the cell, whether the terminal is located in a specified region in the cell.

1025. If the network device determines that the terminal is located in the specified region in the cell, determine that the terminal enters the first state.

1026. If the network device determines that the terminal is not located in the specified region in the cell, determine that the terminal enters the second state.

In this embodiment of the present disclosure, the base station determines, according to a location of the in-vehicle terminal device in the cell, whether the in-vehicle terminal device is located in a specified region in the cell, to determine a state that the in-vehicle terminal device enters. If the base station determines that the in-vehicle terminal device is located in the specified region in the cell, it is determined that the in-vehicle terminal device enters an idle state; and if the base station determines that the in-vehicle terminal device is not located in the specified region in the cell, it is determined that the in-vehicle terminal device enters a connected state.

Figure 5A:
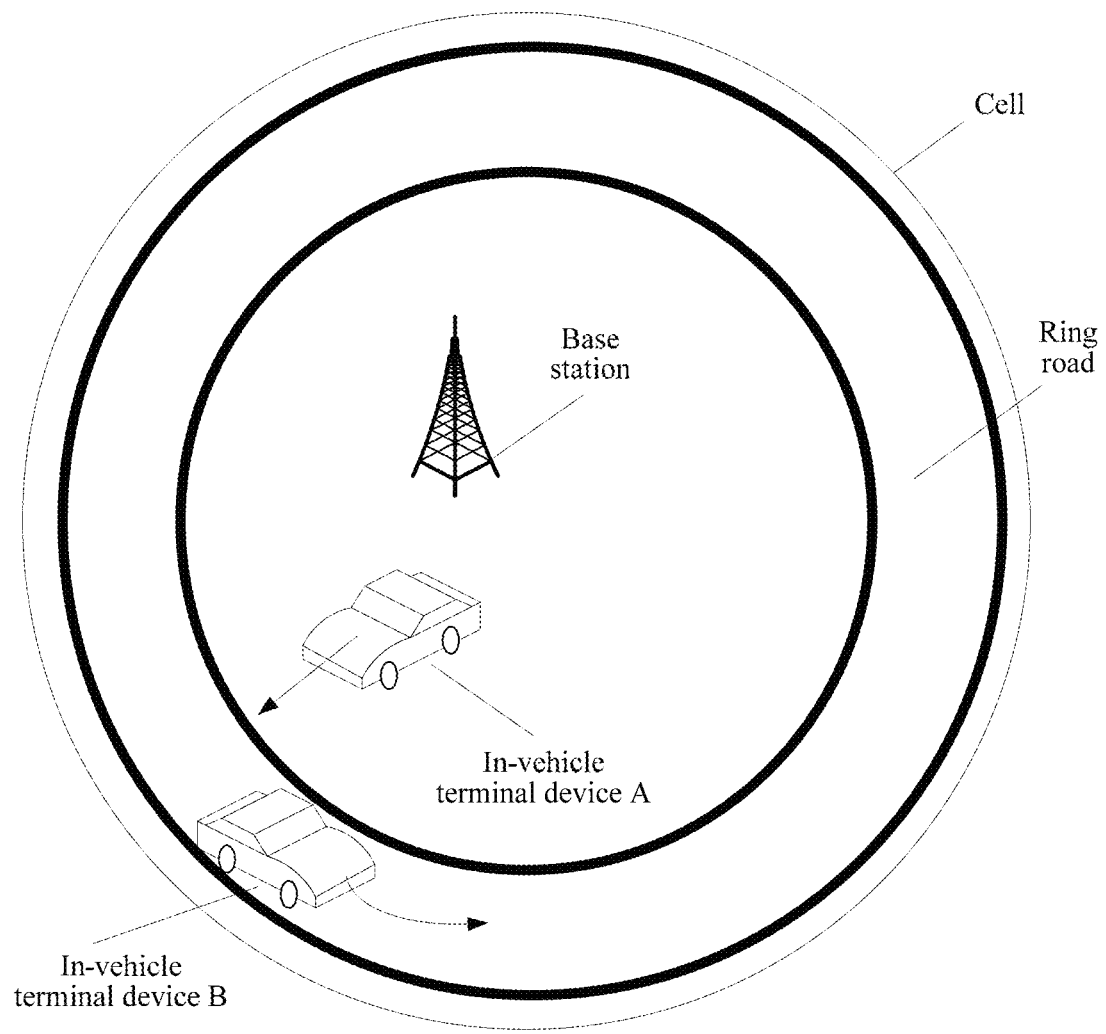
FIG. 5a and FIG. 5b are schematic diagrams of another specific application scenario according to an embodiment of the present disclosure.

It should be noted that, the specified region in the cell may be a region close to a cell edge in the cell, or may be another region preset in the cell. For example: as shown in FIG. 5a, if a ring road exists in the cell, the ring road is located in a cell edge region, but the region in which the ring road is located falls within coverage of the cell, a part of region outside the ring road within the coverage of the cell may be set to a specified region. For example, a part of region between the ring road and the base station may be used as a specified region. A vehicle in which the in-vehicle terminal device B is located travels along the ring road and is in the cell all the time. A vehicle in which the in-vehicle terminal device A is located is closer to the base station than the in-vehicle terminal device B, but the in-vehicle terminal device A is located in the specified region. The in-vehicle terminal device A enters an idle state, and the in-vehicle terminal device B enters a connected state.

According to the information transmission method in a cell provided in this embodiment of the present disclosure, a network device determines a state of a terminal in the cell according to an obtained location of the terminal in the cell, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine the state of the terminal according to whether the obtained location of the terminal in the cell is located in a specified region in the cell, and adjust the network resource used when the terminal performs communication. Therefore, when a movement speed of the terminal in the cell is fast, and as a result, the terminal frequently shuttles between multiple cells, the network device determines the state of the terminal according to whether the location of the terminal in the cell is located in the specified region in the cell, to adjust the network resource used when the terminal performs communication, thereby avoiding occupation of a large quantity of network bandwidths, and improving information transmission efficiency of a wireless network.

Figure 6:
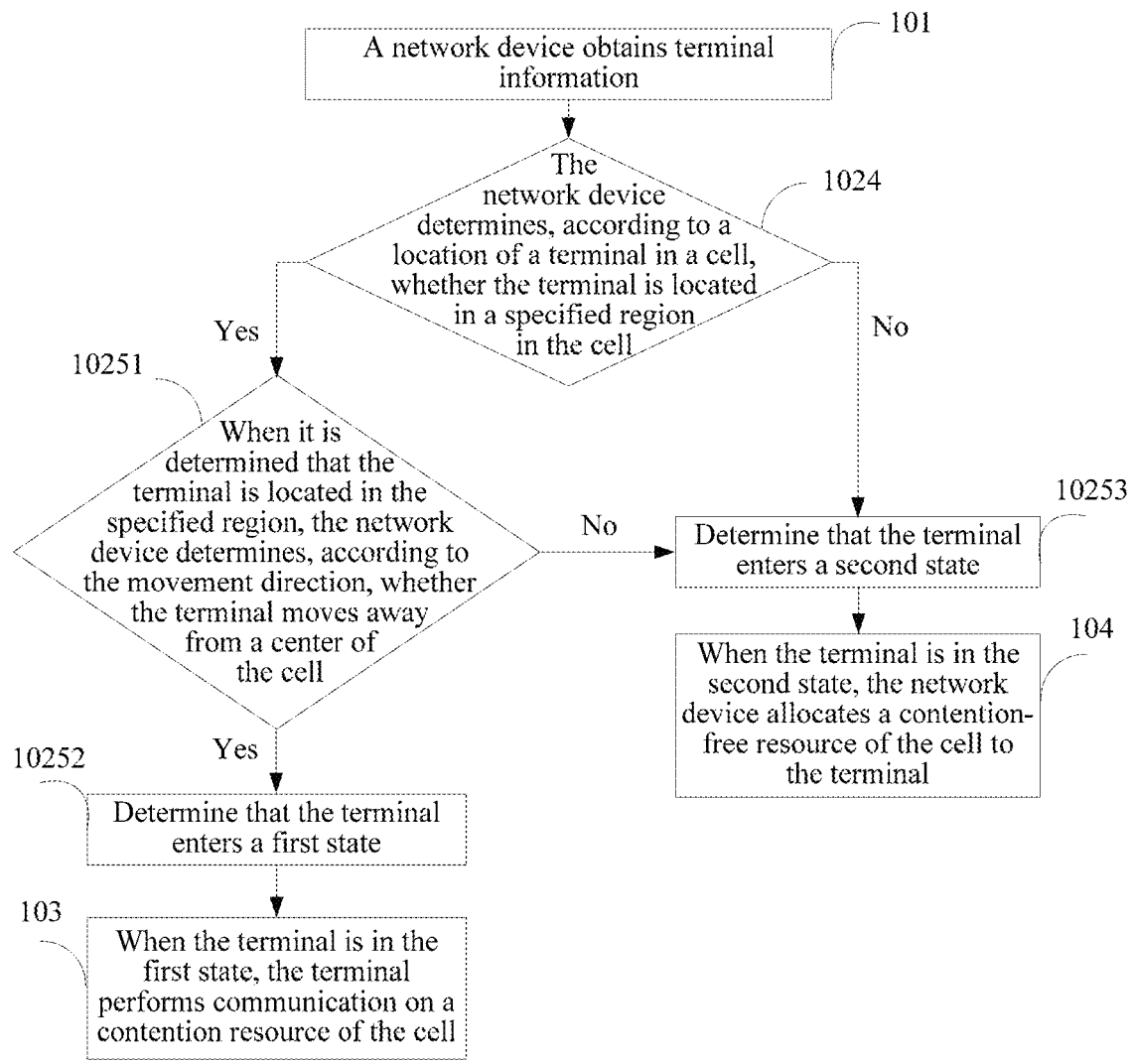
FIG. 6 is a flowchart of another information transmission method in a cell according to an embodiment of the present disclosure.

In this embodiment of the present disclosure, the terminal information may further include a movement direction of the terminal. Therefore, on the basis of the implementation manner shown in FIG. 5, 1025 may be implemented as 10251 to 10253 shown in FIG. 6:

10251. When it is determined that the terminal is located in the specified region, the network device determines, according to the movement direction, whether the terminal moves away from a center of the cell.

In this embodiment of the present disclosure, the network device may request to obtain the movement direction of the terminal from the terminal, or may determine, by comparing a location of the terminal at a previous time and a location of the terminal at this time, whether the movement direction of the terminal is away from the center of the cell. The terminal may measure a current direction parameter of the terminal by using a navigation device or by using a gyroscope or a sensor that the terminal is provided with. Then the direction parameter is reported to the network device.

Figure 5B:
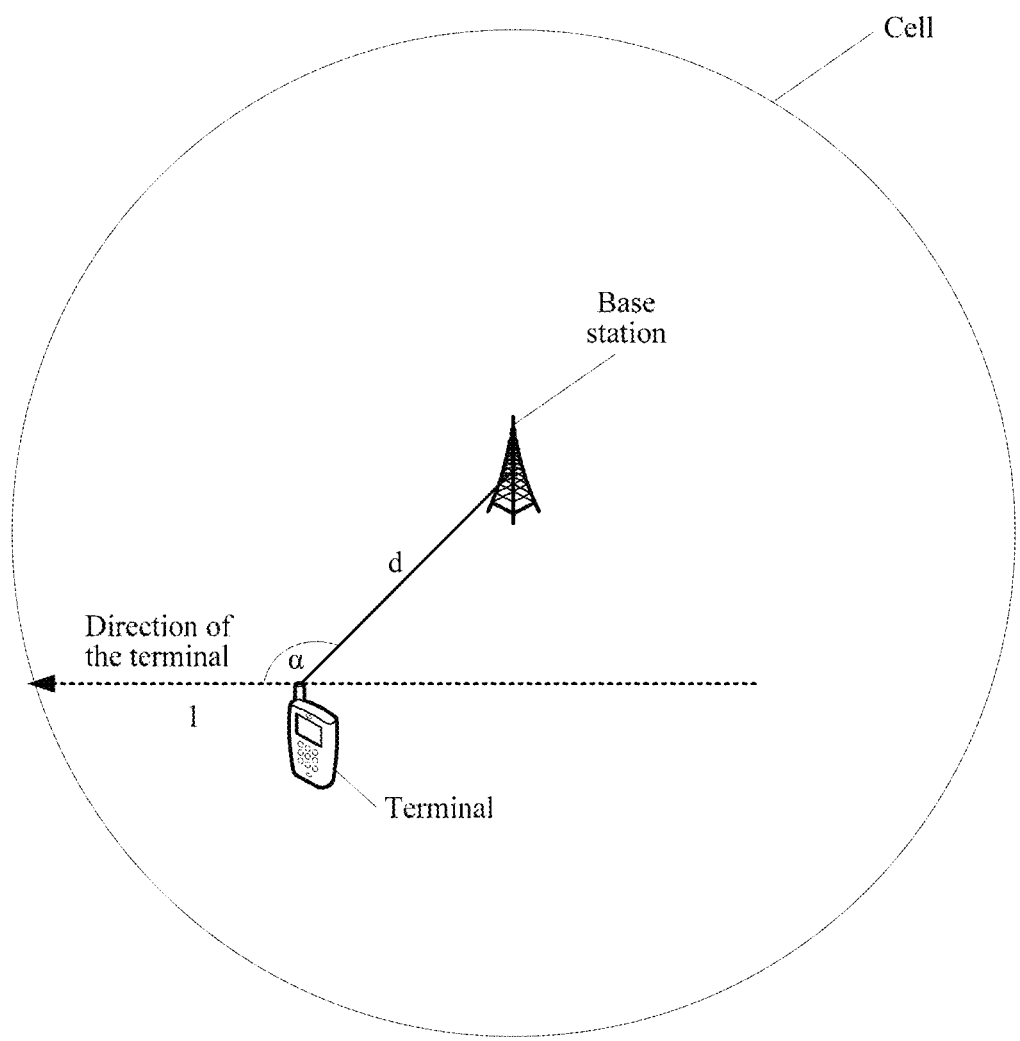

It should be noted that, when the terminal is far away from a center location of the cell and the terminal moves toward a cell edge, it may be considered that the terminal moves away from the center of the cell. For example: in the cell shown in FIG. 5b, the network device is a base station, the base station is located in the center of the cell, and coverage of the cell is circular. After obtaining a current location and a direction, the terminal reports a location parameter and a direction parameter as terminal information to the base station, so that the base station obtains the current location and the movement direction of the terminal. A line segment in which the current location of the terminal and the center of the cell are located is d, a half-line that uses the current location of the terminal as a start point and that is along the current movement direction of the terminal is 1, and an angle formed by d and 1 is $\alpha$. If $\alpha$ is greater than 90°, it may be considered that the terminal moves away from the center of the cell; and if $\alpha$ is less than or equal to 90°, it may be considered that the terminal moves close to the center of the cell.

10252. If the terminal moves away from the center of the cell, determine that the terminal enters the first state.

10253. If the terminal does not move away from the center of the cell, determine that the terminal enters the second state.

In this embodiment of the present disclosure, if the in-vehicle terminal device moves away from the center of the cell, it is determined that the in-vehicle terminal device enters an idle state; and if the in-vehicle terminal device moves close to the center of the cell, it is determined that the in-vehicle terminal device enters a connected state.

Figure 6A:
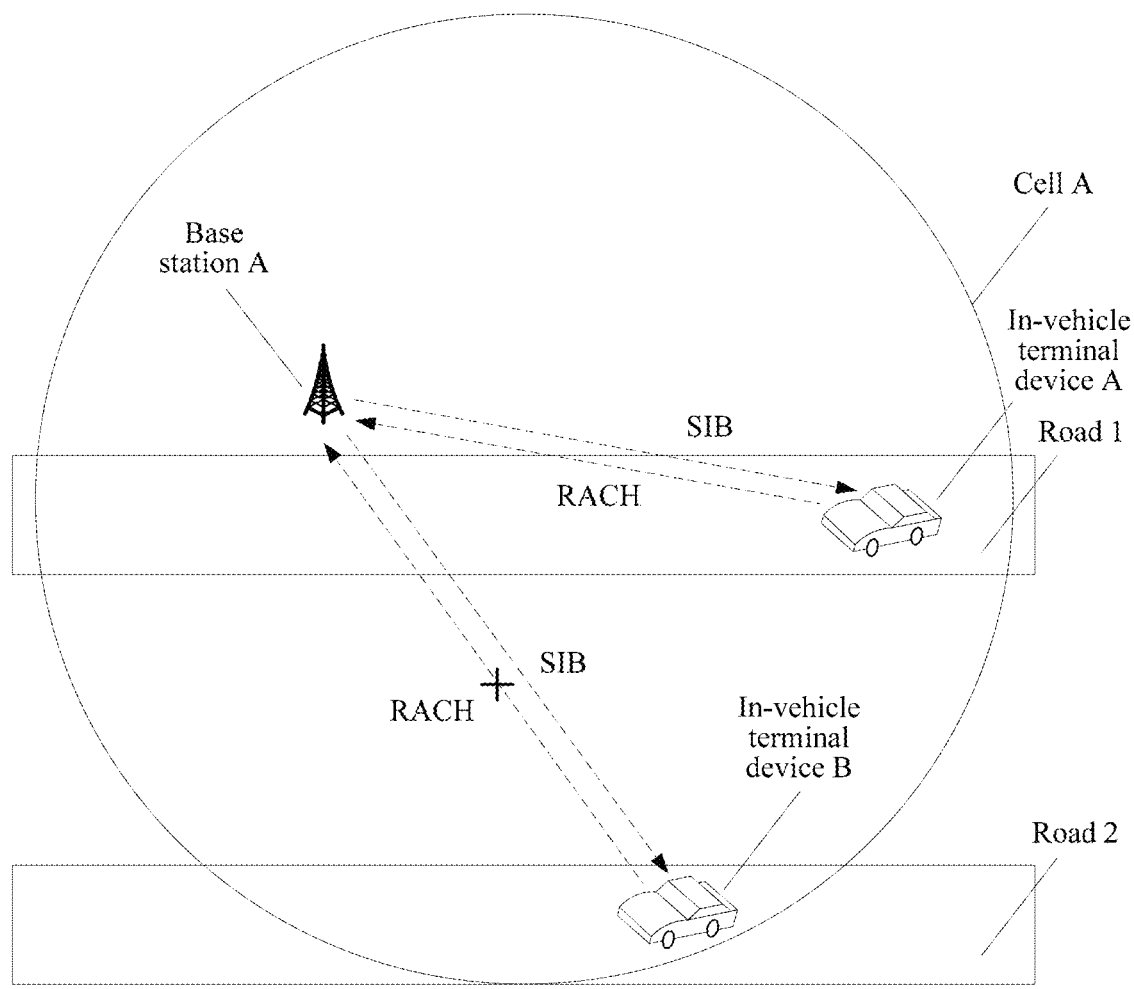
FIG. 6a is a schematic diagram of another specific application scenario according to an embodiment of the present disclosure.

For example: as shown in FIG. 6a, the in-vehicle terminal device A travels along a road 1, the in-vehicle terminal device B travels along a road 2, and the base station A broadcasts SIB (System Information Block, system information block) information in a cell A. Because the in-vehicle terminal device A moves close to a center of the cell A, it is determined that the in-vehicle terminal device A enters a connected state in this case, and the in-vehicle terminal device A initiates a random access process to access the cell; and because the in-vehicle terminal device B moves away from the center of the cell A, it is determined that the in-vehicle terminal device B enters an idle state in this case, the in-vehicle terminal device B does not initiate a random access process.

It should be noted that, the parameters that represent the movement state of the terminal and that are used by the network device to determine whether the terminal easily leaves the cell are not limited to the movement speed of the terminal, the location of the terminal in the cell, and the like, and may also be parameters such as the movement direction of the terminal, and the network device may perform determining according to one parameter that represents the movement state of the terminal, and may also perform determining according to multiple parameters that represent the movement state of the terminal.

For example, a user may preset, according to a requirement, a priority of a parameter that represents a movement state of an in-vehicle terminal device, for example, the parameter that represents a movement state of an in-vehicle terminal device includes: a movement speed of the in-vehicle terminal device and a location of the in-vehicle terminal device in a cell, and the user may preset the movement speed of the in-vehicle terminal device and a priority of a location of the in-vehicle terminal device in the cell. As shown in FIG. 5a, if a ring road exists in the cell, the ring road is located in a cell edge region, but the region in which the ring road is located falls within coverage of the cell, a part of region outside the ring road within the coverage of the cell may be set to a specified region. For example, a part of region between the ring road and the base station may be used as a specified region. A vehicle in which the in-vehicle terminal device B is located travels along the ring road and is in the cell all the time. A vehicle in which the in-vehicle terminal device A is located is closer to the base station than the in-vehicle terminal device B, but the in-vehicle terminal device A is located in the specified region.

A movement speed of the in-vehicle terminal device A is less than a preset speed threshold, and the in-vehicle terminal device A is located in a specified region; and a movement speed of the in-vehicle terminal device B is greater than the preset speed threshold, and the in-vehicle terminal device B is located in a non-specified region. If a priority of the movement speed of the in-vehicle terminal device is higher than that of the location of the in-vehicle terminal device in the cell, it is determined, according to the movement speed of the in-vehicle terminal device, that the in-vehicle terminal device A enters a connected state, and the in-vehicle terminal device B enters an idle state. If the priority of the movement speed of the in-vehicle terminal device is lower than that of the location of the in-vehicle terminal device in the cell, it is determined, according to the location of the in-vehicle terminal device in the cell, that the in-vehicle terminal device A enters an idle state, and the in-vehicle terminal device B enters a connected state.

For another example: as shown in FIG. 5a, if a ring road exists in the cell, the ring road is located in a cell edge region, but the region in which the ring road is located falls within coverage of the cell, a part of region outside the ring road within the coverage of the cell may be set to a specified region. For example, a part of region between the ring road and the base station may be used as a specified region. A vehicle in which the in-vehicle terminal device B is located travels along the ring road and is in the cell all the time. A vehicle in which the in-vehicle terminal device A is located is closer to the base station than the in-vehicle terminal device B, but the in-vehicle terminal device A is located in the specified region, and travels away from the base station. The user may determine, according to a travel direction of the in-vehicle terminal device within a time period, whether the in-vehicle terminal device travels toward a region that is away from the base station and that is outside a coverage region of the cell, or travels in a direction close to the base station. If the in-vehicle terminal device A travels toward the region that is away from the base station and that is outside the coverage region of the cell, the in-vehicle terminal device A enters an idle state, the in-vehicle terminal device B travels along the ring road, and the in-vehicle terminal device B enters a connected state. However, when the in-vehicle terminal device B changes a travel direction within a time period, and the travel direction is consistent with a travel direction of the in-vehicle terminal device A, that is, travels toward the region that is away from the base station and that is outside the coverage region of the cell, the in-vehicle terminal device B enters an idle state. It should be noted that, the user may further determine the travel direction of the in-vehicle terminal device according to the movement speed of the in-vehicle terminal device within a time period. For example: the user may preset a threshold of the movement speed according to a current road status, or obtain an empirical value of the movement speed according to a previous movement speed of the in-vehicle terminal device, use the empirical value as a threshold, and then determine a relationship between the movement speed of the in-vehicle terminal device and the threshold to determine a road status in a coverage region of the cell in which the current in-vehicle terminal device is located, thereby determining the travel direction of the in-vehicle terminal device according to the road status, that is, the in-vehicle terminal device travels toward downtown, or the in-vehicle terminal device travels away from downtown. When the movement speed of the in-vehicle terminal device is greater than the threshold, it may be considered that the in-vehicle terminal device travels toward downtown, and when the movement speed of the in-vehicle terminal device is less than the threshold, it may be considered that the in-vehicle terminal device travels away from downtown.

According to the information transmission method in a cell provided in this embodiment of the present disclosure, a network device determines, according to an obtained movement direction of a terminal in the cell, whether the terminal moves away from a center of the cell, determines a state of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine, according to an obtained movement direction of the terminal located in a specified region, whether the terminal moves away from the center of the cell, determine the state of the terminal, and adjust the network resource used when the terminal performs communication. Therefore, when a movement speed of the terminal in the cell is fast, and as a result, the terminal frequently shuttles between multiple cells, the network device determines, according to the movement direction of the terminal located in the specified region, whether the terminal leaves coverage of the cell within a specified time, and determines the state of the terminal, to adjust the network resource used when the terminal performs communication, thereby avoiding occupation of a large quantity of network bandwidths, and improving information transmission efficiency of a wireless network.

An embodiment of the present disclosure may be applied to a wireless network, where the wireless network includes at least a network device and a terminal, the terminal is located in a cell of the network device, the network device may be specifically a base station, and a terminal device may be specifically a PAD, a smartphone, an in-vehicle terminal or the like.

Figure 7:
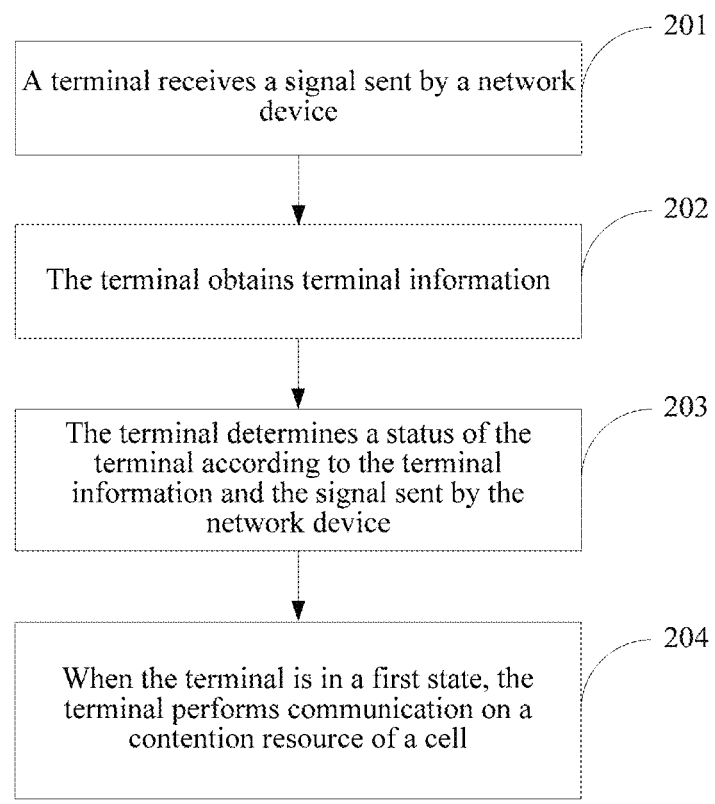
FIG. 7 is a flowchart of another information transmission method in a cell according to an embodiment of the present disclosure.
Figure 7A:
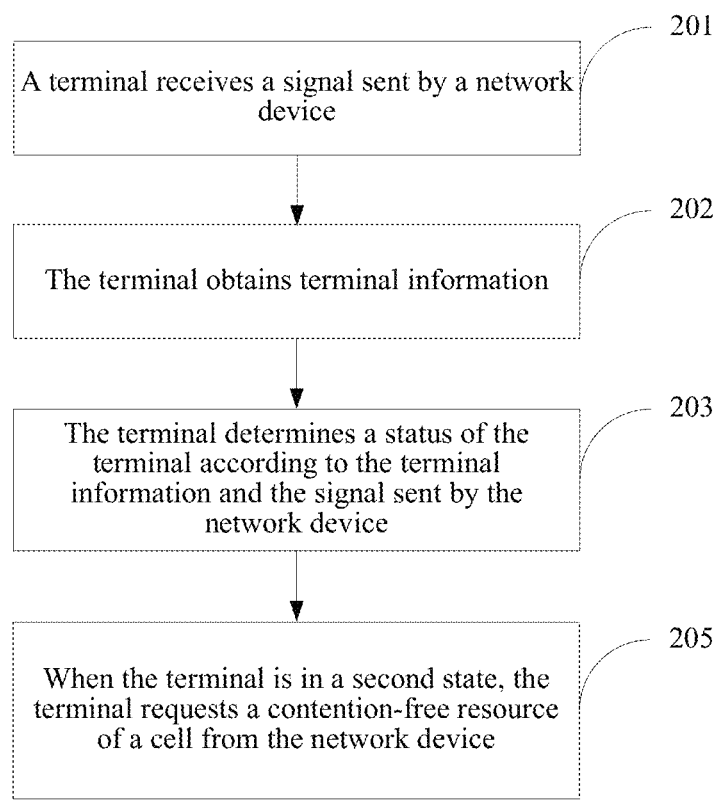
FIG. 7a is a flowchart of another information transmission method in a cell according to an embodiment of the present disclosure.

This embodiment of the present disclosure provides an information transmission method in a cell. As shown in FIG. 7 or FIG. 7a, the method includes the following steps.

201. The terminal receives a signal sent by the network device.

The signal sent by the network device includes at least threshold information. It should be noted that, the signal sent by the network device and received by the terminal may be terminal information broadcast by the network device, or control signaling that includes terminal information, that is sent by the network device, and that is received by the terminal.

202. The terminal obtains terminal information.

The terminal information includes at least a movement speed of the terminal, and/or the terminal information is used to represent a transmission status of uplink data of the terminal.

Using an in-vehicle terminal device as an example, the in-vehicle terminal device receives threshold information, such as a speed threshold or a physical layer parameter threshold, broadcast by the base station, and obtains a movement speed of the in-vehicle terminal device, and/or obtains a transmission status of uplink data of the in-vehicle terminal device.

It should be noted that, the broadcast signal further includes information such as allocation messages based on a contention resource and a contention-free resource; and the broadcast signal may be borne in a synchronization signal, a system broadcast message, a public control channel, RRC signaling or the like. For the movement speed, speed estimation may be performed by the terminal by using a downlink reference signal of a physical layer, channel estimation may be performed according to the downlink reference signal, and then an autocorrelation function (Autocorrelation Function) for two-timeslot channel estimation is obtained, where a channel autocorrelation function conforms to a zero Bessel function. Then a one-to-one mapping relationship between the movement speed of the terminal and a Bessel function value is used to obtain estimation of the movement speed; and/or the movement speed is obtained from an application layer. Using a terminal being an in-vehicle terminal device as an example, the movement speed of the in-vehicle terminal device may be obtained from an application layer, and the application layer delivers the movement speed of the in-vehicle terminal device to a physical layer or another layer.

The estimation of the movement speed of the terminal may be performed on the terminal by using a downlink reference signal, or may be performed on the network device by using an uplink reference signal, and then is fed back to the terminal by using signaling.

203. The terminal determines a state of the terminal according to the terminal information and the signal sent by the network device.

The state of the terminal includes: a first state or a second state.

204. When the terminal is in the first state, the terminal performs communication on a contention resource of the cell.

205. When the terminal is in the second state, the terminal requests a contention-free resource of the cell from the network device.

It should be noted that, the terminal information may be obtained by the network device, and obtained by the terminal from the signal sent by the network device, or may be detected by the terminal. Therefore, 201 and 202 may be performed according to a sequence, or may be performed simultaneously; and after 203 is performed, 204 or 205 may be performed.

In this embodiment of the present disclosure, the first state may be an idle state, the second state may be a connected state, and the in-vehicle terminal device determines, according to obtained terminal information and a broadcast signal, such as a movement speed and a speed threshold, that a state of the in-vehicle terminal device is an idle state or a connected state. For example: a base station A and a base station B are disposed in a wireless network shown in FIG. 2, and the terminal may be an in-vehicle terminal device A and an in-vehicle terminal device B. The terminal serves as an execution body, the base station A and the in-vehicle terminal device A are located in a cell A, and the base station B and the in-vehicle terminal device B are located in a cell B. If the in-vehicle terminal device A is in an idle state, when the in-vehicle terminal device A in the idle state moves between the cell A and the cell B, processes of a cell selection and a cell reselection are performed. A main process is that the in-vehicle terminal device A performs physical layer measurement, selects one cell with a strongest signal from the cell A and cell B, and camps on the cell, and the in-vehicle terminal device A obtains a resource from a contention resource of the cell in a contention manner, to perform communication from the in-vehicle terminal device A to another terminal. If the in-vehicle terminal device B is in a connected state, when the in-vehicle terminal device B in the connected state moves between the cell A and the cell B, an inter-cell handover is performed, and the base station allocates a contention-free resource of the cell on the contention-free resource of the cell to the in-vehicle terminal device B, to ensure communication from the in-vehicle terminal device B to another terminal.

Therefore, as can be seen, an existing handover process is quite complex, and due to fast movement of the terminal, the handover process is executed frequently, and signaling exchange overheads are excessively large. For example, because the movement speed is fast, and the terminal leaves the cell without effectively using a network resource of the current cell, the terminal further needs to perform a handover again. Moreover, in an actual application, many terminals move fast at a cell edge, and a terminal at the edge is usually uplink-limited, where being uplink-limited refers to a transmission status that uplink data cannot be smoothly transferred to a network device from a terminal, and being non-uplink-limited refers to a transmission status that uplink data can be smoothly transferred to a network device from a terminal.

According to the information transmission method in a cell provided in this embodiment of the present disclosure, a terminal determines a state of the terminal according to a received signal sent by a network device, and obtained terminal information, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may determine the state of the terminal according to the received signal sent by the network device, and the obtained terminal information, and adjust the network resource used when the terminal performs communication. Therefore, when a movement speed of the terminal in the cell is fast, and as a result, the terminal frequently shuttles between multiple cells, the terminal determines the state of the terminal, to adjust the network resource used when the terminal performs communication, thereby avoiding occupation of a large quantity of network bandwidths, and improving information transmission efficiency of a wireless network.

Figure 8:
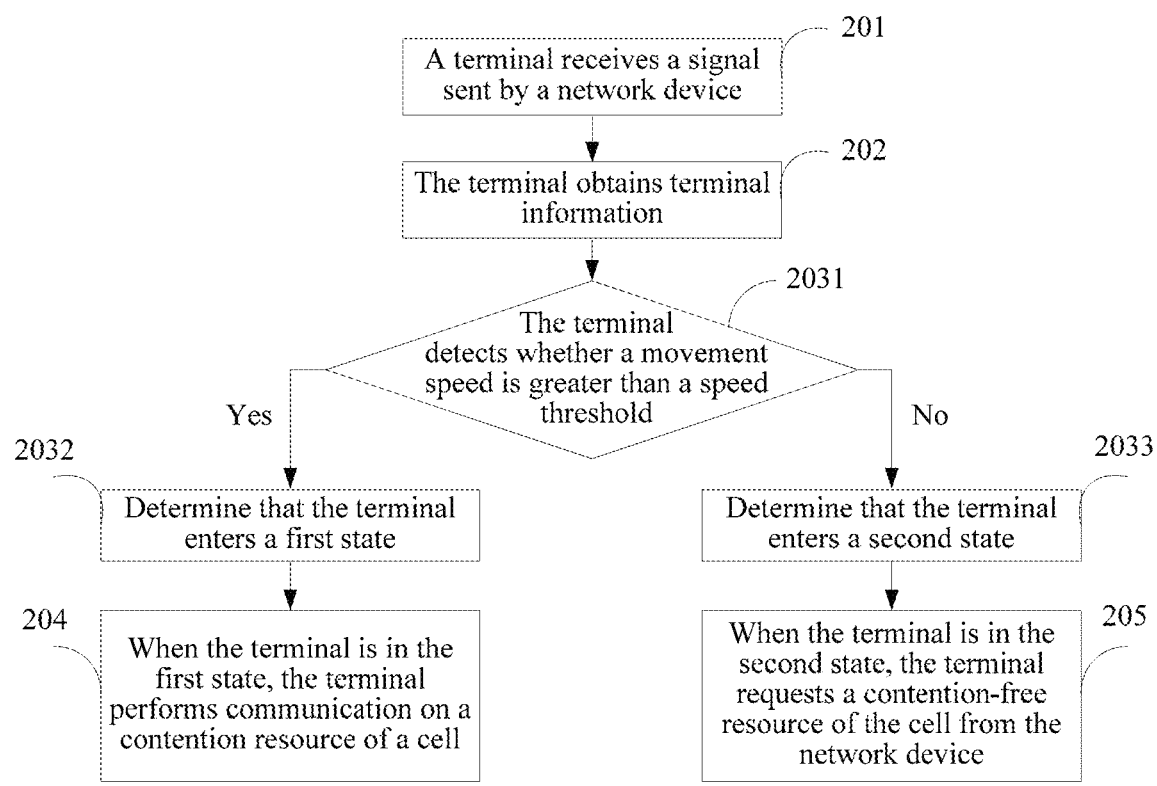
FIG. 8 and FIG. 9 are flowcharts of another information transmission method in a cell according to an embodiment of the present disclosure.

In this embodiment of the present disclosure, when the threshold information sent by the network device is used to represent the speed threshold, the terminal may determine the state of the terminal by detecting whether the movement speed of the terminal is greater than the speed threshold. Therefore, on the basis of the implementation manner shown in FIG. 7 or FIG. 7a, 203 may be implemented as 2031 to 2033 shown in FIG. 8:

2031. The terminal detects whether the movement speed is greater than the speed threshold.

2032. If the terminal detects that the movement speed is greater than the speed threshold, determine that the terminal enters the first state.

2033. If the terminal detects that the movement speed is less than or equal to the speed threshold, determine that the terminal enters the second state.

In this embodiment of the present disclosure, the in-vehicle terminal device determines the state of the in-vehicle terminal device by detecting whether the movement speed of the in-vehicle terminal device is greater than the speed threshold.

If the in-vehicle terminal device detects that the movement speed of the in-vehicle terminal device is greater than the speed threshold, it is determined that the in-vehicle terminal device enters an idle state; and if the in-vehicle terminal device detects that the movement speed of the in-vehicle terminal device is less than or equal to the speed threshold, it is determined that the in-vehicle terminal device enters a connected state.

According to the information transmission method in a cell provided in this embodiment of the present disclosure, a terminal determines a state of the terminal according to a received speed threshold sent by a network device, and an obtained movement speed of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may determine the state of the terminal according to the received speed threshold sent by the network device, and the obtained movement speed of the terminal, and adjust the network resource used when the terminal performs communication. Therefore, when the movement speed of the terminal in the cell is fast, and as a result, the terminal frequently shuttles between multiple cells, the terminal determines the state of the terminal according to a magnitude relationship between the movement speed of the terminal and the speed threshold sent by the network device, to adjust the network resource used when the terminal performs communication, thereby avoiding occupation of a large quantity of network bandwidths, and improving information transmission efficiency of a wireless network.

Figure 9:
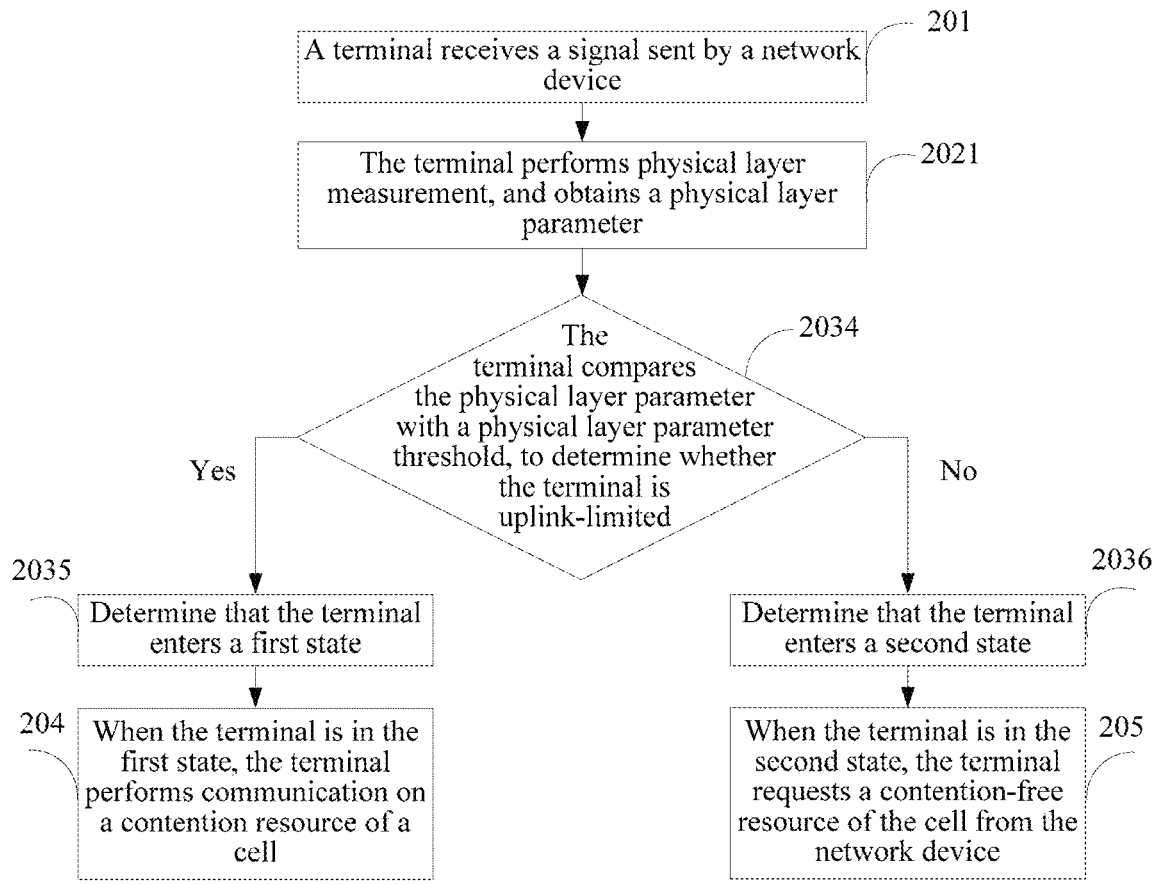

In this embodiment of the present disclosure, on the basis of the implementation manner shown in FIG. 7 or FIG. 7*a*, 202 may be implemented as 2021 shown in FIG. 9, and 203 may be implemented as 2034 to 2036 shown in FIG. 9:

2021. The terminal performs physical layer measurement, and obtains a physical layer parameter.

The physical layer parameter includes at least reference signal received quality RSRQ and/or reference signal received power RSRP.

In this embodiment of the present disclosure, the physical layer parameter may be reference signal received power (RSRP) and/or reference signal received quality (RSRQ), and the in-vehicle terminal device obtains RSRP and/or RSRQ when receiving a signal sent by a base station.

2034. The terminal compares the physical layer parameter with a physical layer parameter threshold, to determine whether the terminal is uplink-limited.

The threshold information is further used to represent the physical layer parameter threshold.

2035. If the terminal is uplink-limited, determine that the terminal enters the first state.

2036. If the terminal is non-uplink-limited, determine that the terminal enters the second state.

In this embodiment of the present disclosure, the physical layer parameter may be RSRP and/or RSRQ, the in-vehicle terminal device performs physical layer measurement according to a downlink reference signal, for example, a reference signal such as a Cell-Specific Reference Signal (CRS), or a Channel State Information Reference Signal (CSI-RS), measures RSRP and/or RSRQ, and compares a measurement result with an RSRP threshold and/or an RSRQ threshold, thereby detecting whether the in-vehicle terminal device is uplink-limited, and then determining a state that the in-vehicle terminal device enters.

For example: when a measured physical layer parameter is RSRP, if the RSRP is greater than the RSRP threshold, it is considered that the in-vehicle terminal device is in a non-uplink-limited region, and it is determined that the in-vehicle terminal device enters a connected state; and if the RSRP is less than or equal to the RSRP threshold, it is considered that the in-vehicle terminal device is in an uplink-limited region, and it is determined that the in-vehicle terminal device enters an idle state.

According to the information transmission method in a cell provided in this embodiment of the present disclosure, a terminal detects, according to a physical layer parameter when a signal sent by a network device is received, whether the terminal is uplink-limited, to determine a state of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may detect, according to a magnitude relationship between the physical layer parameter when the signal sent by the network device is received and a corresponding threshold, whether the terminal is uplink-limited, so as to determine the state of the terminal and adjust the network resource used when the terminal performs communication. Therefore, when a movement speed of the terminal in the cell is fast, and as a result, the terminal frequently shuttles between multiple cells, the terminal determines the state of the terminal according to the magnitude relationship between the physical layer parameter and the corresponding threshold, to adjust the network resource used when the terminal performs communication, thereby avoiding occupation of a large quantity of network bandwidths, and improving information transmission efficiency of a wireless network.

In this embodiment of the present disclosure, the signal sent by the network device and received by the terminal may include: terminal information broadcast by the network device and received by the terminal; or the control signaling that includes terminal information, that is sent by the network device, and that is received by the terminal may be specifically RRC signaling, or other signaling transmitted on a physical control channel. The network device may add the terminal information to a blank field of the control signaling, so that the control signaling bears the terminal information.

According to the information transmission method in a cell provided in this embodiment of the present disclosure, a terminal determines a state of the terminal according to a received signal sent by a network device, and obtained terminal information, and adjusts, according to the state of the terminal, a network resource used when the terminal performs communication. The terminal information may be obtained by receiving terminal information broadcast by the network device, or receiving control signaling that includes terminal information and that is sent by the network device. Compared with the prior art that a terminal frequently executes a cell handover due to fast movement between cells, to adjust a network resource used when the terminal performs communication, in the present disclosure, the terminal may determine the state of the terminal according to the received signal sent by the network device, and the obtained terminal information, and adjust the network resource used when the terminal performs communication. Therefore, when a movement speed of the terminal in the cell is fast, and as a result, the terminal frequently shuttles between multiple cells, the terminal determines the state of the terminal, to adjust the network resource used when the terminal performs communication, thereby avoiding occupation of a large quantity of network bandwidths, and improving information transmission efficiency of a wireless network.

Figure 10:
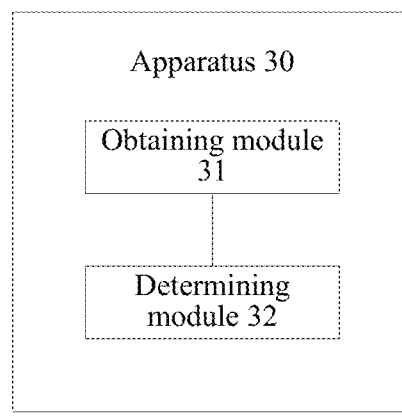
FIG. 10 is a schematic structural diagram of an information transmission apparatus in a cell according to an embodiment of the present disclosure.

An embodiment of the present disclosure provides an information transmission apparatus 30 in a cell. As shown in FIG. 10, the apparatus 30 is applied to a wireless network, the wireless network includes at least a network device and a terminal, the terminal is located in a cell of the network device, and the apparatus 30 includes:

an obtaining module 31, configured to obtain terminal information, where the terminal information includes: a movement speed of the terminal, and/or a location of the terminal in the cell;

a determining module 32, configured to determine a state of the terminal according to the terminal information obtained by the obtaining module 31, where the state of the terminal includes: a first state or a second state.

When the terminal is in the first state, the terminal performs communication on a contention resource of the cell; and when the terminal is in the second state, the network device allocates a contention-free resource of the cell to the terminal.

According to the information transmission apparatus in a cell provided in this embodiment of the present disclosure, a network device determines a state of a terminal according to obtained terminal information in the cell, and adjusts, according to the state of the terminal, a network resource used when the terminal performs communication. Compared with a solution in the prior art that a terminal frequently executes a cell handover due to fast movement between cells, to adjust a network resource used when the terminal performs communication, in the present disclosure, the network device may determine the state of the terminal according to the obtained terminal information, and adjust the network resource used when the terminal performs communication. Therefore, when a movement speed of the terminal in the cell is fast, and as a result, the terminal frequently shuttles between multiple cells, the network device or the terminal determines the state of the terminal, to adjust the network resource used when the terminal performs communication, thereby avoiding occupation of a large quantity of network bandwidths, and improving information transmission efficiency of a wireless network.

In this embodiment of the present disclosure, the determining module 32 is specifically configured to:

detect whether the movement speed of the terminal obtained by the obtaining module 31 is greater than a speed threshold, and if the movement speed of the terminal is greater than the speed threshold, determine that the terminal enters the first state; and if the movement speed of the terminal is less than or equal to the speed threshold, determine that the terminal enters the second state.

According to the information transmission apparatus in a cell provided in this embodiment of the present disclosure, a network device determines a state of a terminal in the cell according to an obtained movement speed of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine the state of the terminal according to a magnitude relationship between the obtained movement speed of the terminal and a speed threshold, and adjust the network resource used when the terminal per-forms communication. Therefore, when the movement speed of the terminal in the cell is fast, and as a result, the terminal frequently shuttles between multiple cells, the network device determines the state of the terminal according to the magnitude relationship between the movement speed of the terminal and the speed threshold, to adjust the network resource used when the terminal performs communication, thereby avoiding occupation of a large quantity of network bandwidths, and improving information transmission efficiency of a wireless network.

In this embodiment of the present disclosure, the determining module 32 is further specifically configured to:

determine, according to the location of the terminal in the cell obtained by the obtaining module 31, whether the terminal is located in a specified region in the cell; and if the terminal is located in the specified region, determine that the terminal enters the first state, and if the terminal is not located in the specified region, determine that the terminal enters the second state.

According to the information transmission apparatus in a cell provided in this embodiment of the present disclosure, a network device determines a state of a terminal in the cell according to an obtained location of the terminal in the cell, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine the state of the terminal according to whether the obtained location of the terminal in the cell is located in a specified region in the cell, and adjust the network resource used when the terminal performs communication. Therefore, when a movement speed of the terminal in the cell is fast, and as a result, the terminal frequently shuttles between multiple cells, the network device determines the state of the terminal according to whether the location of the terminal in the cell is located in the specified region in the cell, to adjust the network resource used when the terminal performs communication, thereby avoiding occupation of a large quantity of network bandwidths, and improving information transmission efficiency of a wireless network.

In this embodiment of the present disclosure, the terminal information further includes a movement direction of the terminal; and the determining module 32 is further specifically configured to:

when it is determined that the terminal is located in the specified region, determine, according to the movement direction obtained by the obtaining module 31, whether the terminal moves away from a center of the cell; and if the terminal moves away from the center of the cell, determine that the terminal enters the first state, and if the terminal does not move away from the center of the cell, determine that the terminal enters the second state.

According to the information transmission apparatus in a cell provided in this embodiment of the present disclosure, and the network device provided in this embodiment of the present disclosure, the network device determines, according to an obtained movement direction of a terminal in the cell, whether the terminal moves away from a center of the cell, determines a state of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine, according to an obtained movement direction of the terminal located in a specified region, whether the terminal moves away from the center of the cell, determine the state of the terminal, and adjust the network resource used when the terminal performs communication. Therefore, when a movement speed of the terminal in the cell is fast, and as a result, the terminal frequently shuttles between multiple cells, the network device determines, according to the movement direction of the terminal located in the specified region, whether the terminal leaves coverage of the cell within a specified time, and determines the state of the terminal, to adjust the network resource used when the terminal performs communication, thereby avoiding occupation of a large quantity of network bandwidths, and improving information transmission efficiency of a wireless network.

Figure 11:
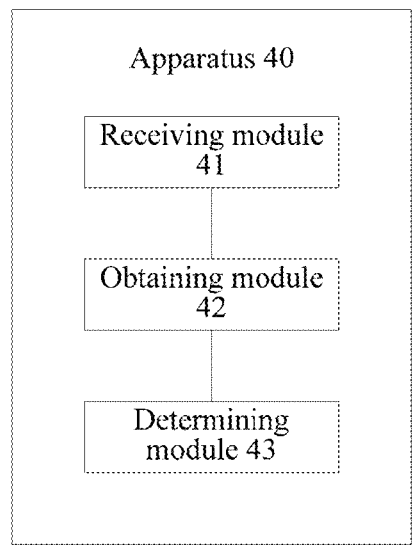
FIG. 11 is a schematic structural diagram of another information transmission apparatus in a cell according to an embodiment of the present disclosure.

An embodiment of the present disclosure provides an information transmission apparatus 40 in a cell. As shown in FIG. 11, the apparatus 40 is applied to a wireless network, the wireless network includes at least a network device and a terminal, the terminal is located in a cell of the network device, and the apparatus 40 includes:

a receiving module 41, configured to receive a signal sent by the network device, where the signal sent by the network device includes at least threshold information;

an obtaining module 42, configured to obtain terminal information, where the terminal information includes at least a movement speed of the terminal, and/or the terminal information is used to represent a transmission status of uplink data of the terminal; and a determining module 43, configured to determine a state of the terminal according to the terminal information obtained by the obtaining module 42 and the signal sent by the network device, where the state of the terminal includes: a first state or a second state.

When the terminal is in the first state, the terminal performs communication on a contention resource of the cell; and when the terminal is in the second state, requests a contention-free resource of the cell from the network device.

According to the information transmission apparatus in a cell provided in this embodiment of the present disclosure, a terminal determines a state of the terminal according to a received signal sent by a network device, and obtained terminal information, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may determine the state of the terminal according to the received signal sent by the network device, and the obtained terminal information, and adjust the network resource used when the terminal performs communication. Therefore, when a movement speed of the terminal in the cell is fast, and as a result, the terminal frequently shuttles between multiple cells, the terminal determines the state of the terminal, to adjust the network resource used when the terminal performs communication, thereby avoiding occupation of a large quantity of network bandwidths, and improving information transmission efficiency of a wireless network.

In this embodiment of the present disclosure, the threshold information is used to represent a speed threshold, and the determining module 43 is specifically configured to:

detect whether the movement speed obtained by the obtaining module 42 is greater than the speed threshold, and if the movement speed is greater than the speed threshold, determine that the terminal enters the first state; and if the movement speed of the terminal is less than or equal to the speed threshold, determine that the terminal enters the second state.

According to the information transmission apparatus in a cell provided in this embodiment of the present disclosure, a terminal determines a state of the terminal according to a received speed threshold sent by a network device, and an obtained movement speed of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may determine the state of the terminal according to the received speed threshold sent by the network device, and the obtained movement speed of the terminal, and adjust the network resource used when the terminal performs communication. Therefore, when the movement speed of the terminal in the cell is fast, and as a result, the terminal frequently shuttles between multiple cells, the terminal determines the state of the terminal according to a magnitude relationship between the movement speed of the terminal and the speed threshold sent by the network device, to adjust the network resource used when the terminal performs communication, thereby avoiding occupation of a large quantity of network bandwidths, and improving information transmission efficiency of a wireless network.

In this embodiment of the present disclosure, the obtaining module 42 is specifically configured to:

perform physical layer measurement, and obtain a physical layer parameter, where the physical layer parameter includes at least reference signal received quality RSRQ and/or reference signal received power RSRP.

The determining module 43 is further specifically configured to:

compare the physical layer parameter obtained by the obtaining module 42 with a physical layer parameter threshold, and determine whether the terminal is uplink-limited, where the threshold information is further used to represent the physical layer parameter threshold; and if the terminal is uplink-limited, determine that the terminal enters the first state, and if the terminal is non-uplink-limited, determine that the terminal enters the second state.

According to the information transmission apparatus in a cell provided in this embodiment of the present disclosure, a terminal detects, according to a physical layer parameter when a signal sent by a network device is received, whether the terminal is uplink-limited, to determine a state of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may detect, according to a magnitude relationship between the physical layer parameter when the signal sent by the network device is received and a corresponding threshold, whether the terminal is uplink-limited, so as to determine the state of the terminal and adjust the network resource used when the terminal performs communication. Therefore, when a movement speed of the terminal in the cell is fast, and as a result, the terminal frequently shuttles between multiple cells, the terminal determines the state of the terminal according to the magnitude relationship between the physical layer parameter and the corresponding threshold, to adjust the network resource used when the terminal performs communication, thereby avoiding occupation of a large quantity of network bandwidths, and improving information transmission efficiency of a wireless network.

In this embodiment of the present disclosure, the receiving module 41 is specifically configured to:

receive terminal information broadcast by the network device; or receive control signaling that includes the terminal information and that is sent by the network device.

According to the information transmission apparatus in a cell provided in this embodiment of the present disclosure, a terminal determines a state of the terminal according to a received signal sent by a network device, and obtained terminal information, and adjusts, according to the state of the terminal, a network resource used when the terminal performs communication. The terminal information may be obtained by receiving terminal information broadcast by the network device, or receiving control signaling that includes terminal information and that is sent by the network device. Compared with the prior art that a terminal frequently executes a cell handover due to fast movement between cells, to adjust a network resource used when the terminal performs communication, in the present disclosure, the terminal may determine the state of the terminal according to the received signal sent by the network device, and the obtained terminal information, and adjust the network resource used when the terminal performs communication. Therefore, when a movement speed of the terminal in the cell is fast, and as a result, the terminal frequently shuttles between multiple cells, the terminal determines the state of the terminal, to adjust the network resource used when the terminal performs communication, thereby avoiding occupation of a large quantity of network bandwidths, and improving information transmission efficiency of a wireless network.

Figure 12:
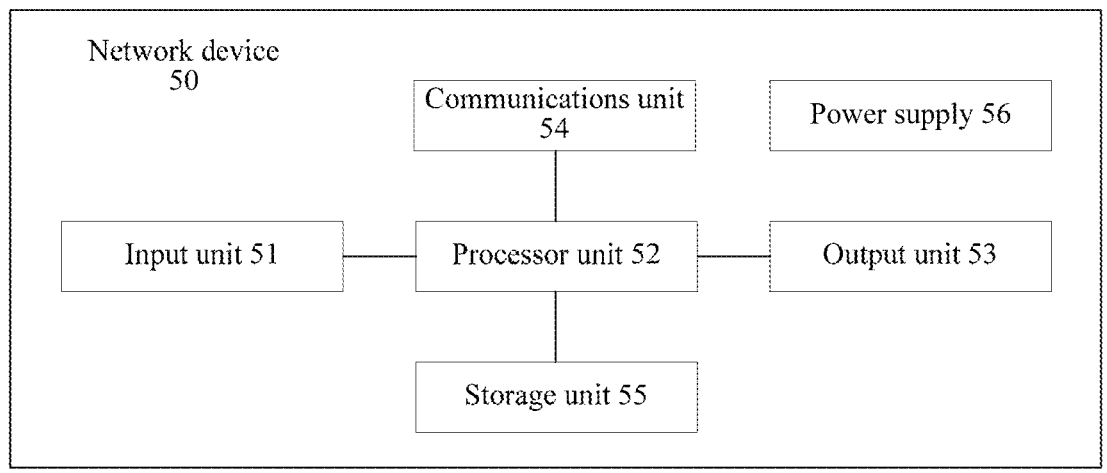
FIG. 12 is a schematic structural diagram of a network device according to an embodiment of the present disclosure.

An embodiment of the present disclosure further provides a network device 50. The network device 50 may be applied to a wireless network, where the wireless network includes at least a network device 50 and a terminal, and the terminal is located in a cell of the network device 50. FIG. 12 shows a possible specific implementation manner of the network device 50, which includes components such as an input unit 51, a processor unit 52, an output unit 53, a communications unit 54, and a storage unit 55. These components perform communication by using one or more buses. A person skilled in the art may understand that the structure of the network device 50 shown in the figure does not constitute a limitation to the present disclosure and may be a bus-form structure or a star-form structure, and the network device 50 may further include more or components or fewer components than those shown in the figure, or some components may be combined, or a different component deployment may be used. In an implementation manner of the present disclosure, the network device 50 may be any device with data storage, processing, transmission functions, and includes, but is not limited to, a blade server, a tower server, a cabinet server, a mobile workstation, a personal computer, and a combination of the foregoing two or more.

The input unit 51 is configured to implement interaction between an operator and the network device 50 and/or input information to the network device 50. For example, the input unit 51 may receive digit or character information input by an operator, to generate signal input related to the operator or function control. In a specific implementation manner of the present disclosure, the input unit 51 may be a touch panel, or may be another human-computer interaction interface, for example, a physical input key. In another implementation manner of the present disclosure, the physical input key used by the input unit 51 may include, but is not limited to, one or more of a physical keyboard, a functional key (such as a volume control key or a switch key), a trackball, a mouse, and a joystick.

The processor unit 52 is a control center of the network device 50, is connected to each part of the entire network device 50 by using various interfaces and lines, and runs or executes a software program and/or module stored in the storage unit 55, and invokes data stored in the storage unit 55, to execute various functions of the network device 50 and/or process data. The processor unit 52 may include an integrated circuit (Integrated Circuit, IC), for example, include a single packaged IC, or include multiple connected ICs having a same function or different functions. For example, the processor unit 52 may include only a central processing unit (Central Processing Unit, CPU), or may include a combination of a GPU, a digital signal processor (Digital Signal Processor, DSP), and a control chip (such as a base band chip) in the communications unit. In an implementation manner of the present disclosure, the CPU may be a single computing core or may include multiple computing cores.

The communications unit 54 is configured to establish a communication channel, so that the network device 50 connects to a device such as a terminal by using the communication channel. The terminal may be specifically a remote server. The communications unit 54 may include communications modules such as a wired local area network module, a wireless local area network (Wireless Local Area Network, wireless LAN) module, a Bluetooth module, and a base band (Base Band) module. The communications modules are configured to control communication of components in the network device 50, and may support direct memory access (Direct Memory Access).

In different implementation manners of the present disclosure, communications modules in the communications unit 54 usually appear in a form of an integrated circuit chip (Integrated Circuit Chip), can be combined selectively, and do not need to include all communications modules and corresponding physical cables and antenna groups. In some optional implementation manners of the present disclosure, a communications module in the communications unit 54, for example, a base band module may be integrated in the processor unit 52, typically, such as an APQ+MDM series platform provided by the Qualcomm (Qualcomm) cooperation.

The output unit 53 includes, but is not limited to, an image output unit and an audio output unit. The image output unit is configured to output a text, an image, and/or a video. The image output unit may include a display panel. For example, the display panel may be configured by using an LCD (Liquid Crystal Display, liquid crystal display), an OLED (Organic Light-Emitting Diode, organic light-emitting diode), a field emission display (field emission display, FED), or the like. Alternatively, the image output unit may include a reflective display, for example, an electrophoretic (electrophoretic) display, or a display using a technology of interferometric modulation of light (Interferometric Modulation of Light). The image output unit may include a single display or multiple displays of different sizes. In a specific implementation manner of the present disclosure, the touch panel used by the input unit 51 may also be used as a display panel of the output unit 53. For example, after detecting a gesture operation of touching on or getting close to the touch panel, the touch panel transfers the touch operation to the processor unit 52, so as to determine a type of a touch event. Then, the processor unit 52 provides corresponding visual output on the display panel according to the type of the touch event. Although in FIG. 12, the input unit 51 and the output unit 53 serve as two independent parts to implement input and output functions of the network device 50, in some embodiments, the touch panel and the display panel may be integrated to implement the input and output functions of the network device 50. For example, the image output unit may display various graphical user interfaces (Graphical User Interface, GUI) as virtual control components, which include, but are not limited to, a window, a scroll bar, an icon, and a clipboard, for the user to perform an operation by means of touch control. In a specific implementation manner of the present disclosure, the image output unit includes a filter and an amplifier, which are configured to filter and amplify a video output by the processor unit 52. The audio output unit includes a digital-to-analog converter, configured to convert, from a digital format into an analog format, an audio signal that is output by the processor unit 52.

The storage unit 55 may be configured to store a software program and module, and the processor unit 52 runs the software program and module stored in the storage unit 55, to execute various function applications of the network device 50 and implement data processing. The storage unit 55 mainly includes a program storage area and a data storage area. The program storage area may store an operating system, an application program required by at least one function, such as a sound playback program and an image display program. The data storage area may store data (such as audio data and an address book) created according to use of the network device 50, and the like. In a specific implementation manner of the present disclosure, the storage unit 55 may include a volatile memory, for example, a nonvolatile random access memory (NVRAM), a phase change random access memory (PRAM), or a magnetoresistive random access memory (MRAM), and may further include a nonvolatile memory, for example, at least one magnetic storage device, an Electrically Erasable Programmable Read-Only Memory (EEPROM), or a flash memory, for example, an NOR flash memory or an NAND flash memory. The nonvolatile memory stores the operating system and the application program executed by the processor unit 52. The processor unit 52 loads a running program and data from the nonvolatile memory to a memory, and stores digital content in a large scale storage apparatus. The operating system includes various components and/or drivers that are used for control and management of regular system tasks, such as memory management, storage device control, and power management, and that facilitate communication between various types of software and hardware. In an implementation manner of the present disclosure, the operating system may be a Linux system, an iOS system developed by Apple or a Windows operating system developed by Microsoft, or an embedded operating system such as Vxworks. The application program includes any application installed in the network device 50, and includes, but is not limited to, a browser, an E-mail, an instant messaging service, text processing, keyboard virtualization, a window widget (Widget), encryption, digital copyright management, speech recognition, speech replication, positioning (for example, a function provided by a global positioning system), music playback, and the like.

A power supply 56 is configured to supply power to different components of the network device 50 to maintain running of the components. As general understanding, the power supply 56 may be an external power supply, for example, an AC adapter, that directly supplies power to the network device 50, and also include a built-in battery, for example, a common lithium-ion battery or NiMH battery. In some implementation manners of the present disclosure, the power supply 56 may also have broader definitions, for example, may also include a power management system, a charging system, a power failure detection circuit, a power converter or inverter, a power state indicator (for example, a light emitting diode), and any other component related to generation, management, and distribution of electric energy for the network device 50.

In this embodiment of the present disclosure, the communications unit 54 is configured to obtain terminal information, where the terminal information includes: a movement speed of the terminal, and/or a location of the terminal in the cell.

The processor unit 52 is configured to determine a state of the terminal according to the terminal information obtained by the communications unit 54, where the state of the terminal includes: a first state or a second state.

When the terminal is in the first state, the terminal performs communication on a contention resource of the cell; and when the terminal is in the second state, the network device allocates a contention-free resource of the cell to the terminal.

According to the network device provided in this embodiment of the present disclosure, the network device determines a state of a terminal according to obtained terminal information in a cell, and adjusts, according to the state of the terminal, a network resource used when the terminal performs communication. Compared with a solution in the prior art that a terminal frequently executes a cell handover due to fast movement between cells, to adjust a network resource used when the terminal performs communication, in the present disclosure, the network device may determine the state of the terminal according to the obtained terminal information, and adjust the network resource used when the terminal performs communication. Therefore, when a movement speed of the terminal in the cell is fast, and as a result, the terminal frequently shuttles between multiple cells, the network device or the terminal determines the state of the terminal, to adjust the network resource used when the terminal performs communication, thereby avoiding occupation of a large quantity of network bandwidths, and improving information transmission efficiency of a wireless network.

In this embodiment of the present disclosure, the processor unit 52 is specifically configured to:

detect whether the movement speed of the terminal obtained by the communications unit 54 is greater than a speed threshold, and if the movement speed of the terminal is greater than the speed threshold, determine that the terminal enters the first state; and if the movement speed of the terminal is less than or equal to the speed threshold, determine that the terminal enters the second state.

According to the network device provided in this embodiment of the present disclosure, the network device determines a state of a terminal according to an obtained movement speed of the terminal in a cell, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine the state of the terminal according to a magnitude relationship between the obtained movement speed of the terminal and a speed threshold, and adjust the network resource used when the terminal performs communication. Therefore, when the movement speed of the terminal in the cell is fast, and as a result, the terminal frequently shuttles between multiple cells, the network device determines the state of the terminal according to the magnitude relationship between the movement speed of the terminal and the speed threshold, to adjust the network resource used when the terminal performs communication, thereby avoiding occupation of a large quantity of network bandwidths, and improving information transmission efficiency of a wireless network.

In this embodiment of the present disclosure, the processor unit 52 is further specifically configured to:

determine, according to the location of the terminal in the cell obtained by the communications unit 54, whether the terminal is located in a specified region in the cell; and if the terminal is located in the specified region, determine that the terminal enters the first state, and if the terminal is not located in the specified region, determine that the terminal enters the second state.

According to the network device provided in this embodiment of the present disclosure, the network device determines a state of a terminal in a cell according to an obtained location of the terminal in the cell, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine the state of the terminal according to whether the obtained location of the terminal in the cell is located in a specified region in the cell, and adjust a network resource used when the terminal performs communication. Therefore, when a movement speed of the terminal in the cell is fast, and as a result, the terminal frequently shuttles between multiple cells, the network device determines the state of the terminal according to whether the location of the terminal in the cell is located in the specified region in the cell, to adjust the network resource used when the terminal performs communication, thereby avoiding occupation of a large quantity of network bandwidths, and improving information transmission efficiency of a wireless network.

In this embodiment of the present disclosure, the terminal information further includes a movement direction of the terminal; and the processor unit 52 is further specifically configured to:

when it is determined that the terminal is located in the specified region, determine, according to the movement direction obtained by the communications unit 54, whether the terminal moves away from a center of the cell; and if the terminal moves away from the center of the cell, determine that the terminal enters the first state, and if the terminal does not move away from the center of the cell, determine that the terminal enters the second state.

According to the network device provided in this embodiment of the present disclosure, the network device determines, according to an obtained movement direction of a terminal in a cell, whether the terminal moves away from a center of the cell, determines a state of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine, according to the obtained movement direction of the terminal located in a specified region, whether the terminal moves away from the center of the cell, determine the state of the terminal, and adjust the network resource used when the terminal performs communication. Therefore, when a movement speed of the terminal in the cell is fast, and as a result, the terminal frequently shuttles between multiple cells, the network device determines, according to the movement direction of the terminal located in the specified region, whether the terminal leaves coverage of the cell within a specified time, and determines the state of the terminal, to adjust the network resource used when the terminal performs communication, thereby avoiding occupation of a large quantity of network bandwidths, and improving information transmission efficiency of a wireless network.

Figure 13:
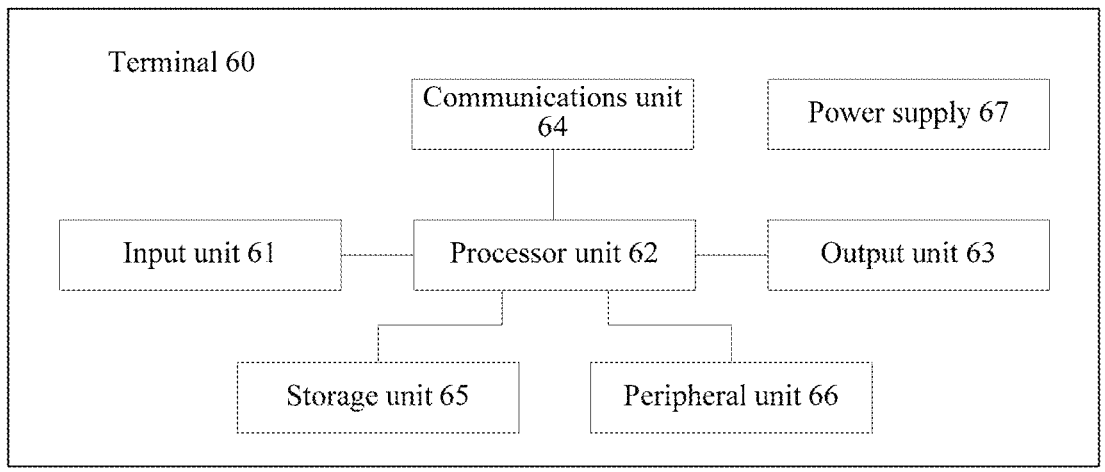
FIG. 13 is a schematic structural diagram of a terminal according to an embodiment of the present disclosure.

An embodiment of the present disclosure further provides a terminal 60. The terminal 60 may be applied to a wireless network, where the wireless network includes at least a network device and the terminal 60, and the terminal 60 is located in a cell of the network device. FIG. 13 shows a possible specific implementation manner of the terminal 60, which includes components such as an input unit 61, a processor unit 62, an output unit 63, a communications unit 64, and a storage unit 65, and a peripheral unit 66. These components perform communication by using one or more buses. A person skilled in the art may understand that the structure of the terminal 60 shown in the figure does not constitute a limitation to the present disclosure and may be a bus-form structure or a star-form structure, and the terminal 60 may further include more or components or fewer components than those shown in the figure, or some components may be combined, or a different component deployment may be used. In an implementation manner of the present disclosure, the terminal 60 may be any mobile or portable electronic device, and includes, but is not limited to, a mobile phone, a mobile computer, a tablet computer, a personal digital assistant (Personal Digital Assistant, PDA), a media player, a smart television, and a combination of the foregoing two or more.

The input unit 61 is configured to implement interaction between an operator and the terminal 60 and/or input information to the terminal 60. For example, the input unit 61 may receive digit or character information input by an operator, to generate signal input related to the operator or function control. In a specific implementation manner of the present disclosure, the input unit 61 may be a touch panel, or may be another human-computer interaction interface, such as a physical input key or a microphone, or may be another external information capturing apparatus, for example, a camera. The touch panel, which is also referred to as a touchscreen or a touch screen, can collect an operation action of the user on or near the touch panel, for example, an operation action of the user on the touch panel or at a position near the touch panel by using any suitable object or accessory such as a finger or a stylus, and drive a corresponding connection apparatus according to a preset program. Optionally, the touch panel may include two parts: a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into coordinates of a touch point, and sends the coordinates to a processor unit 62. The touch controller may further receive and execute an order sent by a processing unit. In addition, the touch panel may be a resistive, capacitive, infrared (Infrared), or surface acoustic wave touch panel. In another implementation manner of the present disclosure, the physical input key used by the input unit 61 may include, but is not limited to, one or more of a physical keyboard, a functional key (such as a volume control key or a switch key), a trackball, a mouse, and a joystick. The input unit in a microphone form may collect voice input by a user or an environment, and convert the voice into an order that is in an electrical-signal form and that may be executed by the processing unit.

In some other implementation manners of the present disclosure, the input unit 61 may further be various sensing devices, for example, a Hall device, configured to detect a physical quantity of the terminal 60, such as force, torque, pressure, stress, location, displacement, speed, acceleration, angle, angular velocity, revolution, rotational speed, and a time at which a working state changes, to convert the physical quantity into a quantity of electricity to perform detection and control. Some other sensing devices may further include a gravity sensor, a tri-axis accelerometer, a gyroscope, and the like.

The processor unit 62 is a control center of the terminal 60, is connected to each part of the entire terminal 60 by using various interfaces and lines, and runs or executes a software program and/or module stored in the storage unit 65, and invokes data stored in the storage unit 65, to execute various functions of the terminal 60 and/or process data. The processor unit 62 may include an integrated circuit (Integrated Circuit, IC), for example, include a single packaged IC, or include multiple connected ICs having a same function or different functions. For example, the processor unit 62 may include only a central processing unit (Central Processing Unit, CPU), or may include a combination of a GPU, a digital signal processor (Digital Signal Processor, DSP), and a control chip (such as a base band chip) in the communications unit 64. In an implementation manner of the present disclosure, the CPU may be a single computing core or may include multiple computing cores.

The communications unit 64 is configured to establish a communication channel, so that the terminal 60 connects to a device such as a network device by using the communication channel, where the terminal 60 may be specifically a remote server, and download media data from the remote server. The communications unit 64 may include communications modules such as a wired local area network module, a wireless local area network (Wireless Local Area Network, wireless LAN) module, a Bluetooth module, and a base band (Base Band) module, and a radio frequency (Radio Frequency, RF) circuit corresponding to the communications modules, and is configured to perform wireless local area network communication, Bluetooth communication, infrared communication and/or cellular communications system communication, for example, wideband code division multiple access (Wideband Code Division Multiple Access, W-CDMA) and/or high speed downlink packet access (High Speed Downlink Packet Access, HSDPA). The communications modules are configured to control communication of components in the terminal 60, and may support direct memory access (Direct Memory Access).

In different implementation manners of the present disclosure, communications modules in the communications unit 64 usually appear in a form of an integrated circuit chip (Integrated Circuit Chip), can be combined selectively, and do not need to include all communications modules and corresponding physical cables and antenna groups. For example, the communications unit 64 may include only a base band chip, a radio frequency chip, and a corresponding antenna, to provide a communications function in a cellular communications system. The terminal 60 may be connected to a cellular network or the Internet by means of a wireless communication connection, for example, wireless local area network access or WCDMA access, established by the communications unit 64. In some optional implementation manners of the present disclosure, a communications module in the communications unit 64, for example, a base band module may be integrated in the processor unit 62, typically, such as an APQ+MDM series platform provided by the Qualcomm cooperation.

The radio frequency circuit is configured to receive and send a signal during an information receiving and sending process or during a call. For example, after downlink information of a base station is received, the downlink information is sent to the processor unit 62 for processing; and in addition, designed uplink data is sent to the base station. Usually, the radio frequency circuit includes a known circuit for performing these functions, which includes, but is not limited to, an antenna system, a radio frequency transceiver, one or more amplifiers, a tuner, one or more oscillators, a digital signal processor, a codec chip set, a subscriber identity module (SIM) card, a memory, and the like. In addition, the radio frequency circuit may also communicate with a network and another device by means of wireless communication. The wireless communication may use any communications standard or protocol, which includes, but is not limited to: Global System for Mobile communications (GSM), General Packet Radio Service (GPRS), Code Division Multiple Access (CDMA), Wideband Code Division Multiple Access (WCDMA), High Speed Downlink Packet Access (HSDPA), Long Term Evolution (LTE), E-mail, Short Messaging Service (SMS), and the like.

The output unit 63 includes, but is not limited to, an image output unit and an audio output unit. The image output unit is configured to output a text, an image, and/or a video. The image output unit may include a display panel. For example, the display panel may be configured by using an Liquid Crystal Display (LCD), an Organic Light-Emitting Diode (OLED), a field emission display (FED), or the like. Alternatively, the image output unit may include a reflective display, for example, an electrophoretic display, or a display using a technology of interferometric modulation of light. The image output unit may include a single display or multiple displays of different sizes. In a specific implementation manner of the present disclosure, the touch panel used by the input unit 61 may also be used as a display panel of the output unit 63. For example, after detecting a gesture operation of touching on or getting close to the touch panel, the touch panel transfers the touch operation to the processor unit 62, so as to determine a type of a touch event. Then, the processor unit 62 provides corresponding visual output on the display panel according to the type of the touch event. Although in FIG. 13, the input unit 61 and the output unit 63 serve as two independent parts to implement input and output functions of the terminal 60, in some embodiments, the touch panel and the display panel may be integrated to implement the input and output functions of the terminal 60. For example, the image output unit may display various graphical user interfaces (GUI) as virtual control components, which include, but are not limited to, a window, a scroll bar, an icon, and a clipboard, for the user to perform an operation by means of touch control. In a specific implementation manner of the present disclosure, the image output unit includes a filter and an amplifier, which are configured to filter and amplify a video output by the processor unit 62. The audio output unit includes a digital-to-analog converter, configured to convert, from a digital format into an analog format, an audio signal that is output by the processor unit 62.

The storage unit 65 may be configured to store a software program and module, and the processor unit 62 runs the software program and module stored in the storage unit 65, to execute various function applications of the terminal 60 and implement data processing. The storage unit 65 mainly includes a program storage area and a data storage area. The program storage area may store an operating system, an application program required by at least one function, such as a sound playback program and an image display program. The data storage area may store data (such as audio data and an address book) created according to use of the terminal 60 and the like. In a specific implementation manner of the present disclosure, the storage unit 65 may include a volatile memory, for example, a nonvolatile random access memory (NVRAM), a phase change random access memory (PRAM), or a magnetoresistive random access memory (MRAM), and may further include a nonvolatile memory, for example, at least one magnetic storage device, an Electrically Erasable Programmable Read-Only Memory (EE-PROM), or a flash memory, for example, an NOR flash memory or an NAND flash memory. The nonvolatile memory stores the operating system and the application program executed by the processor unit 62. The processor unit 62 loads a running program and data from the nonvolatile memory to a memory, and stores digital content in a large scale storage apparatus. The operating system includes various components and/or drivers that are used for control and management of regular system tasks, such as memory management, storage device control, and power management, and that facilitate communication between various types of software and hardware. In an implementation manner of the present disclosure, the operating system may be an Android system of Google, an iOS system developed by Apple, or a Windows operating system developed by Microsoft, or may be an embedded operating system such as Vxworks. The application program includes any application installed in the terminal 60, and includes, but is not limited to, a browser, an E-mail, an instant messaging service, text processing, keyboard virtualization, a window widget (Widget), encryption, digital copyright management, speech recognition, speech replication, positioning (for example, a function provided by a global positioning system), music playback, and the like.

A power supply 67 is configured to supply power to different components of the terminal 60 to maintain running of the components. As general understanding, the power supply 67 may be a built-in battery, such as a common lithium-ion battery or a NiMH battery, or may include an external power supply, for example, an AC adapter, that directly supplies power to the terminal 60. In some implementation manners of the present disclosure, the power supply 67 may also have broader definitions, for example, may also include a power management system, a charging system, a power failure detection circuit, a power converter or inverter, a power state indicator (for example, a light emitting diode), and any other component related to generation, management, and distribution of electric energy for the terminal 60.

In this embodiment of the present disclosure, the communications unit 64 is configured to receive a signal sent by the network device, where the signal sent by the network device includes at least threshold information.

The communications unit 64 is further configured to obtain terminal information, where the terminal information includes at least a movement speed of the terminal 60, and/or the terminal information is used to represent a transmission state of uplink data of the terminal 60.

The processor unit 62 is configured to determine a state of the terminal 60 according to the terminal information obtained by the communications unit 64 and the signal sent by the network device, where the state of the terminal 60 includes: a first state or a second state.

When the terminal 60 is in the first state, the terminal 60 performs communication on a contention resource of the cell; and when the terminal 60 is in the second state, requests a contention-free resource of the cell from the network device.

According to the terminal provided in this embodiment of the present disclosure, the terminal determines a state of the terminal according to a received signal sent by a network device, and obtained terminal information, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may determine the state of the terminal according to the received signal sent by the network device, and the obtained terminal information, and adjust the network resource used when the terminal performs communication. Therefore, when a movement speed of the terminal in the cell is fast, and as a result, the terminal frequently shuttles between multiple cells, the terminal determines the state of the terminal, to adjust the network resource used when the terminal performs communication, thereby avoiding occupation of a large quantity of network bandwidths, and improving information transmission efficiency of a wireless network.

In this embodiment of the present disclosure, the threshold information is used to represent a speed threshold, and the processor unit 62 is specifically configured to:

detect whether the movement speed obtained by the communications unit 64 is greater than the speed threshold, and if the movement speed is greater than the speed threshold, determine that the terminal 60 enters the first state; and if the movement speed of the terminal 60 is less than or equal to the speed threshold, determine that the terminal 60 enters the second state.

According to the terminal provided in this embodiment of the present disclosure, the terminal determines a state of the terminal according to a received speed threshold sent by a network device, and an obtained movement speed of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may determine the state of the terminal according to the received speed threshold sent by the network device, and the obtained movement speed of the terminal, and adjust the network resource used when the terminal performs communication. Therefore, when the movement speed of the terminal in the cell is fast, and as a result, the terminal frequently shuttles between multiple cells, the terminal determines the state of the terminal according to a magnitude relationship between the movement speed of the terminal and the speed threshold sent by the network device, to adjust the network resource used when the terminal performs communication, thereby avoiding occupation of a large quantity of network bandwidths, and improving information transmission efficiency of a wireless network.

In this embodiment of the present disclosure, the communications unit 64 is specifically configured to:

perform physical layer measurement, and obtain a physical layer parameter, where the physical layer parameter includes at least reference signal received quality RSRQ and/or reference signal received power RSRP.

The processor unit 62 is further specifically configured to:

compare the physical layer parameter obtained by the communications unit 64 with a physical layer parameter threshold, and determine whether the terminal 60 is uplink-limited, where the threshold information is further used to represent the physical layer parameter threshold; and if the terminal is uplink-limited, determine that the terminal 60 enters the first state, and if the terminal is non-uplink-limited, determine that the terminal 60 enters the second state.

According to the terminal provided in this embodiment of the present disclosure, the terminal detects, according to a physical layer parameter when a signal sent by a network device is received, whether the terminal is uplink-limited, to determine a state of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may detect, according to a magnitude relationship between the physical layer parameter when the signal sent by the network device is received and a corresponding threshold, whether the terminal is uplink-limited, so as to determine the state of the terminal and adjust the network resource used when the terminal performs communication. Therefore, when a movement speed of the terminal in the cell is fast, and as a result, the terminal frequently shuttles between multiple cells, the terminal determines the state of the terminal according to the magnitude relationship between the physical layer parameter and the corresponding threshold, to adjust the network resource used when the terminal performs communication, thereby avoiding occupation of a large quantity of network bandwidths, and improving information transmission efficiency of a wireless network.

In this embodiment of the present disclosure, the communications unit 64 is further specifically configured to:

receive terminal information broadcast by the network device; or receive control signaling that includes the terminal information and that is sent by the network device.

According to the terminal provided in this embodiment of the present disclosure, the terminal determines a state of the terminal according to a received signal sent by the network device, and obtained terminal information, and adjusts, according to the state of the terminal, a network resource used when the terminal performs communication. The terminal information may be obtained by receiving terminal information broadcast by the network device, or receiving control signaling that includes terminal information and that is sent by the network device. Compared with the prior art that a terminal frequently executes a cell handover due to fast movement between cells, to adjust a network resource used when the terminal performs communication, in the present disclosure, the terminal may determine the state of the terminal according to the received signal sent by the network device, and the obtained terminal information, and adjust the network resource used when the terminal performs communication. Therefore, when a movement speed of the terminal in the cell is fast, and as a result, the terminal frequently shuttles between multiple cells, the terminal determines the state of the terminal, to adjust the network resource used when the terminal performs communication, thereby avoiding occupation of a large quantity of network bandwidths, and improving information transmission efficiency of a wireless network.

Figure 14:
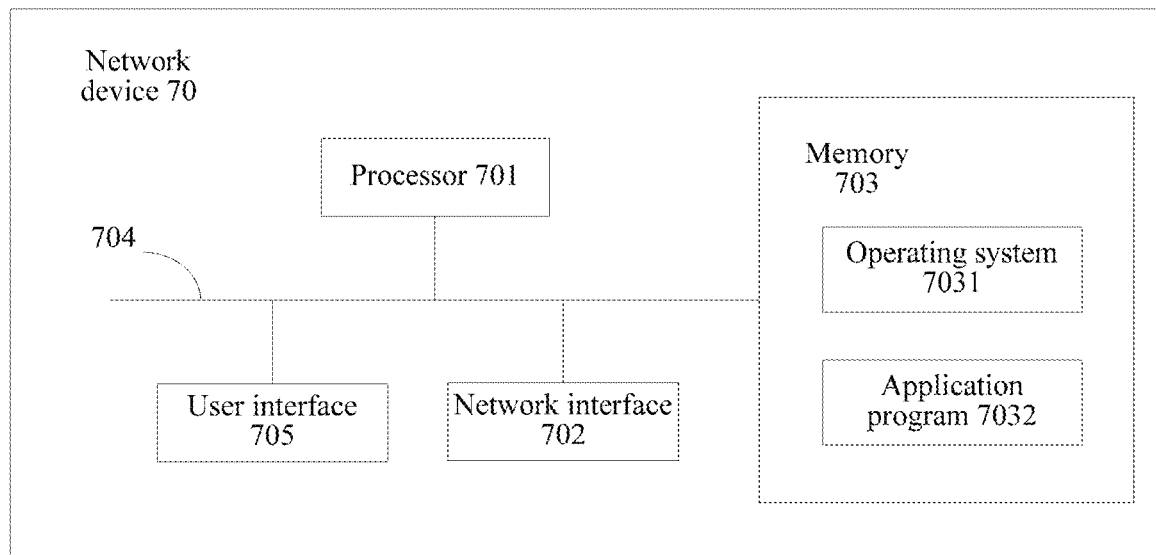
FIG. 14 is a schematic structural diagram of another network device according to an embodiment of the present disclosure.

This embodiment of the present disclosure provides a network device 70. As shown in FIG. 14, the network device 70 includes at least: a processor 701, a network interface 702, a memory 703, and a communications bus 704; the communications bus 704 is configured to implement connection communication between the processor 701, the network interface 702, and the memory 703; and the memory 703 is configured to store data involved in a running process of the network device 70. Optionally, the network device 70 further includes a user interface 705, including a display, a keyboard, or a click device (for example, a mouse, a trackball, a touch panel, or a touch display screen). The memory 703 may include a high-speed RAM memory, and may further include a non-volatile memory, for example, at least one magnetic disk storage. The memory 703 may optionally include at least one storage apparatus located far away from the processor 701. The network device 70 may be applied to a wireless network, where the wireless network includes at least the network device 70 and a terminal, and the terminal is located in a cell of the network device 70.

In some implementation manners, the memory 703 stores the following elements, an executable module or a data structure, or a subset of the following elements, the executable module or the data structure, or an extension set of the following elements, the executable module or the data structure:

an operating system 7031, including various service system programs, and configured to implement various basic services and process a hardware-based task; and an application program 7032, including various application programs, and configured to implement various application services.

In this embodiment of the present disclosure, the network interface 702 is configured to obtain terminal information, where the terminal information includes: a movement speed of the terminal, and/or a location of the terminal in the cell.

The processor 701 is configured to determine a state of the terminal according to the terminal information obtained by the network interface 702, where the state of the terminal includes: a first state or a second state.

When the terminal is in the first state, the terminal performs communication on a contention resource of the cell; and when the terminal is in the second state, the network device allocates a contention-free resource of the cell to the terminal.

According to the network device provided in this embodiment of the present disclosure, the network device determines a state of a terminal according to obtained terminal information in a cell, and adjusts, according to the state of the terminal, a network resource used when the terminal performs communication. Compared with a solution in the prior art that a terminal frequently executes a cell handover due to fast movement between cells, to adjust a network resource used when the terminal performs communication, in the present disclosure, the network device may determine the state of the terminal according to the obtained terminal information, and adjust the network resource used when the terminal performs communication. Therefore, when a movement speed of the terminal in the cell is fast, and as a result, the terminal frequently shuttles between multiple cells, the network device or the terminal determines the state of the terminal, to adjust the network resource used when the terminal performs communication, thereby avoiding occupation of a large quantity of network bandwidths, and improving information transmission efficiency of a wireless network.

In this embodiment of the present disclosure, the processor 701 is specifically configured to:

detect whether the movement speed of the terminal obtained by the network interface 702 is greater than a speed threshold, and if the movement speed of the terminal is greater than the speed threshold, determine that the terminal enters the first state; and if the movement speed of the terminal is less than or equal to the speed threshold, determine that the terminal enters the second state.

According to the network device provided in this embodiment of the present disclosure, the network device determines a state of a terminal in a cell according to an obtained movement speed of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine the state of the terminal according to a magnitude relationship between the obtained movement speed of the terminal and a speed threshold, and adjust the network resource used when the terminal performs communication. Therefore, when the movement speed of the terminal in the cell is fast, and as a result, the terminal frequently shuttles between multiple cells, the network device determines the state of the terminal according to the magnitude relationship between the movement speed of the terminal and the speed threshold, to adjust the network resource used when the terminal performs communication, thereby avoiding occupation of a large quantity of network bandwidths, and improving information transmission efficiency of a wireless network.

In this embodiment of the present disclosure, the processor 701 is further specifically configured to:

determine, according to the location of the terminal in the cell obtained by the network interface 702, whether the terminal is located in a specified region in the cell; and if the terminal is located in the specified region, determine that the terminal enters the first state, and if the terminal is not located in the specified region, determine that the terminal enters the second state.

According to the network device provided in this embodiment of the present disclosure, the network device determines a state of a terminal in a cell according to an obtained location of the terminal in the cell, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine the state of the terminal according to whether the obtained location of the terminal in the cell is located in a specified region in the cell, and adjust the network resource used when the terminal performs communication. Therefore, when a movement speed of the terminal in the cell is fast, and as a result, the terminal frequently shuttles between multiple cells, the network device determines the state of the terminal according to whether the location of the terminal in the cell is located in the specified region in the cell, to adjust the network resource used when the terminal performs communication, thereby avoiding occupation of a large quantity of network bandwidths, and improving information transmission efficiency of a wireless network.

In this embodiment of the present disclosure, the terminal information further includes a movement direction of the terminal; and the processor 701 is further specifically configured to:

when it is determined that the terminal is located in the specified region, determine, according to the movement direction obtained by the network interface 702, whether the terminal moves away from a center of the cell; and if the terminal moves away from the center of the cell, determine that the terminal enters the first state, and if the terminal does not move away from the center of the cell, determine that the terminal enters the second state.

According to the network device provided in this embodiment of the present disclosure, the network device determines, according to an obtained movement direction of a terminal in a cell, whether the terminal moves away from a center of the cell, determines a state of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the network device may determine, according to the obtained movement direction of the terminal located in a specified region, whether the terminal moves away from the center of the cell, determine the state of the terminal, and adjust the network resource used when the terminal performs communication. Therefore, when a movement speed of the terminal in the cell is fast, and as a result, the terminal frequently shuttles between multiple cells, the network device determines, according to the movement direction of the terminal located in the specified region, whether the terminal leaves coverage of the cell within a specified time, and determines the state of the terminal, to adjust the network resource used when the terminal performs communication, thereby avoiding occupation of a large quantity of network bandwidths, and improving information transmission efficiency of a wireless network.

Figure 15:
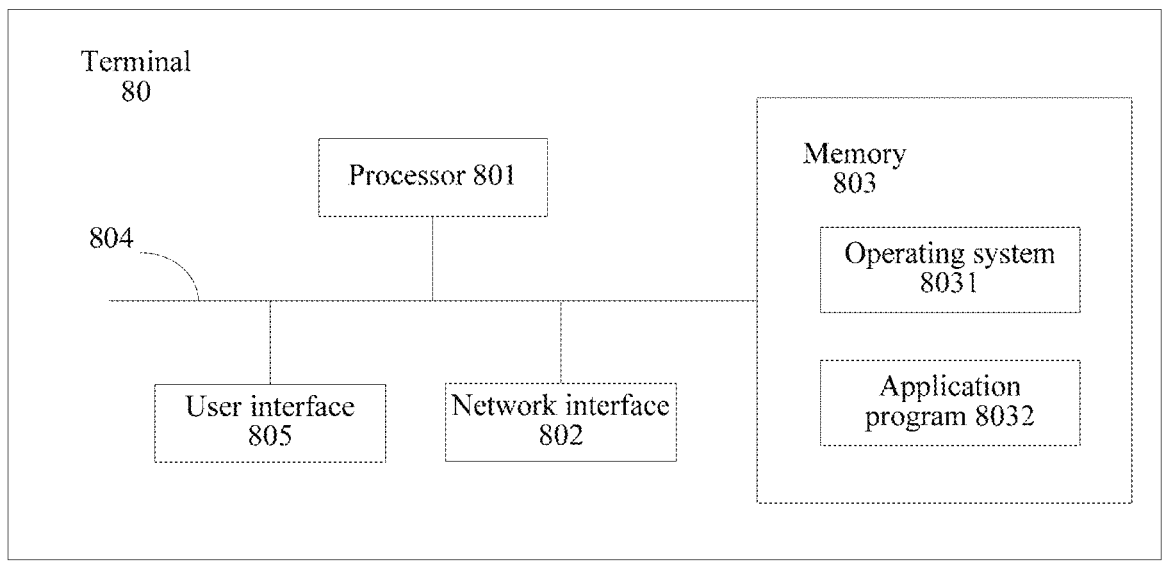
FIG. 15 is a schematic structural diagram of another terminal according to an embodiment of the present disclosure.

This embodiment of the present disclosure provides a terminal 80. As shown in FIG. 15, the terminal 80 includes at least: a processor 801, a network interface 802, a memory 803, and a communications bus 804; the communications bus 804 is configured to implement connection communication between the processor 801, the network interface 802, and the memory 803; and the memory 803 is configured to store data involved in a running process of the terminal 80. Optionally, the terminal 80 further includes a user interface 805, including a display, a keyboard, or a click device (for example, a mouse, a trackball (trackball), a touch panel, or a touch display screen). The memory 803 may include a high-speed RAM memory, and may further include a non-volatile memory (non-volatile memory), for example, at least one magnetic disk storage. The memory 803 may optionally include at least one storage apparatus located far away from the processor 801. The terminal 80 may be applied to a wireless network, the wireless network includes at least a network device and the terminal 80, and the terminal 80 is located in a cell of the network device.

In some implementation manners, the memory 803 stores the following elements, an executable module or a data structure, or a subset of the following elements, the executable module or the data structure, or an extension set of the following elements, the executable module or the data structure:

an operating system 8031, including various service system programs, and configured to implement various basic services and process a hardware-based task; and an application program 8032, including various application programs, and configured to implement various application services.

In this embodiment of the present disclosure, the network interface 802 is configured to receive a signal sent by the network device, where the signal sent by the network device includes at least threshold information.

The network interface 802 is further configured to obtain terminal information, where the terminal information includes at least a movement speed of the terminal 80, and/or the terminal information is used to represent a transmission status of uplink data of the terminal 80.

The processor 801 is configured to determine a state of the terminal 80 according to the terminal information obtained by the network interface 802 and the signal sent by the network device, where the state of the terminal 80 includes: a first state or a second state.

When the terminal is in the first state, the terminal performs communication on a contention resource of the cell; and when the terminal is in the second state, the network device allocates a contention-free resource of the cell to the terminal.

According to the terminal provided in this embodiment of the present disclosure, the terminal determines a state of the terminal according to a received signal sent by a network device, and obtained terminal information, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may determine the state of the terminal according to the received signal sent by the network device, and the obtained terminal information, and adjust the network resource used when the terminal performs communication. Therefore, when a movement speed of the terminal in the cell is fast, and as a result, the terminal frequently shuttles between multiple cells, the terminal determines the state of the terminal, to adjust the network resource used when the terminal performs communication, thereby avoiding occupation of a large quantity of network bandwidths, and improving information transmission efficiency of a wireless network.

In this embodiment of the present disclosure, the threshold information is used to represent a speed threshold, and the processor 801 is specifically configured to:

detect whether the movement speed obtained by the network interface 802 is greater than the speed threshold, and if the movement speed is greater than the speed threshold, determine that the terminal 80 enters the first state; and if the movement speed of the terminal 80 is less than or equal to the speed threshold, determine that the terminal 80 enters the second state.

According to the terminal provided in this embodiment of the present disclosure, the terminal determines a state of the terminal according to a received speed threshold sent by a network device, and an obtained movement speed of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may determine the state of the terminal according to the received speed threshold sent by the network device, and the obtained movement speed of the terminal, and adjust the network resource used when the terminal performs communication. Therefore, when the movement speed of the terminal in the cell is fast, and as a result, the terminal frequently shuttles between multiple cells, the terminal determines the state of the terminal according to a magnitude relationship between the movement speed of the terminal and the speed threshold sent by the network device, to adjust the network resource used when the terminal performs communication, thereby avoiding occupation of a large quantity of network bandwidths, and improving information transmission efficiency of a wireless network.

In this embodiment of the present disclosure, the network interface 802 is specifically configured to:

perform physical layer measurement, and obtain a physical layer parameter, where the physical layer parameter includes at least reference signal received quality RSRQ and/or reference signal received power RSRP.

The processor 801 is further specifically configured to:

compare the physical layer parameter obtained by the network interface 802 with a physical layer parameter threshold, and determine whether the terminal 80 is uplink-limited, where the threshold information is further used to represent the physical layer parameter threshold; and if the terminal 80 is uplink-limited, determine that the terminal 80 enters the first state, and if the terminal 80 is non-uplink-limited, determine that the terminal 80 enters the second state.

According to the terminal provided in this embodiment of the present disclosure, the terminal detects, according to a physical layer parameter when a signal sent by a network device is received, whether the terminal is uplink-limited, to determine a state of the terminal, and adjusts, according to the state of the terminal, a network resource used when the terminal performs communication. Compared with the prior art that a terminal frequently executes a cell handover due to fast movement between cells, to adjust a network resource used when the terminal performs communication, in the present disclosure, the terminal may detect, according to a magnitude relationship between the physical layer parameter when the signal sent by the network device is received and a corresponding threshold, whether the terminal is uplink-limited, so as to determine the state of the terminal and adjust the network resource used when the terminal performs communication. Therefore, when a movement speed of the terminal in the cell is fast, and as a result, the terminal frequently shuttles between multiple cells, the terminal determines the state of the terminal according to the magnitude relationship between the physical layer parameter and the corresponding threshold, to adjust the network resource used when the terminal performs communication, thereby avoiding occupation of a large quantity of network bandwidths, and improving information transmission efficiency of a wireless network.

In this embodiment of the present disclosure, the network interface 802 is further specifically configured to:

receive terminal information broadcast by the network device; or receive control signaling that includes the terminal information and that is sent by the network device.

According to the terminal provided in this embodiment of the present disclosure, the terminal determines a state of the terminal according to a received signal sent by a network device, and obtained terminal information, and adjusts, according to the state of the terminal, a network resource used when the terminal performs communication. The terminal information may be obtained by receiving terminal information broadcast by the network device, or receiving control signaling that includes terminal information and that is sent by the network device. Compared with the prior art that a terminal frequently executes a cell handover due to fast movement between cells, to adjust a network resource used when the terminal performs communication, in the present disclosure, the terminal may determine the state of the terminal according to the received signal sent by the network device, and the obtained terminal information, and adjust a network resource used when the terminal performs communication. Therefore, when a movement speed of the terminal in the cell is fast, and as a result, the terminal frequently shuttles between multiple cells, the terminal determines the state of the terminal, to adjust the network resource used when the terminal performs communication, thereby avoiding occupation of a large quantity of network bandwidths, and improving information transmission efficiency of a wireless network.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information transmission method for use in a wireless network comprising at least a network device and a terminal located in a cell of the network device, the method comprising:
sending, by the network device, a signal to the terminal, wherein the signal comprises threshold information, wherein the terminal performs physical layer measurement, and obtains a physical layer parameter, wherein the physical layer parameter comprises at least one of references signal received quality (RSRQ) or reference signal received power (RSRP);
receiving, by the network device, a request for a contention resource from the terminal when the terminal is in a first state, wherein the terminal compares the physical layer parameter with a physical layer parameter threshold, to determine whether the terminal is uplink-limited and therefore in the first state;
when the terminal is in the first state, determining, by the network device, to not allocate a contention-free resource of the cell to the terminal, wherein not allocating a contention-free resource causes the terminal to perform communication on a contention resource of the cell; and
when the terminal is in the second state, allocating, by the network device, a contention-free resource of the cell to the terminal, wherein the terminal is in the second state when the terminal is not uplink-limited.

2. An information transmission method for use in a wireless network comprising at least a network device and a terminal located in a cell of the network device, the method comprising:
receiving, by the terminal, a signal sent by the network device, wherein the signal sent by the network device comprises threshold information;
performing, by the terminal, physical layer measurement, and obtaining a physical layer parameter, wherein the physical layer parameter comprises at least one of references signal received quality (RSRQ) or reference signal received power (RSRP);
comparing, by the terminal, the physical layer parameter with a physical layer parameter threshold, and determining whether the terminal is uplink-limited, wherein the threshold information further represents the physical layer parameter threshold;
if the terminal is uplink-limited, determining that the terminal is in a first state, and if the terminal is non-uplink-limited, determining that the terminal is in a second state
when the terminal is in the first state, performing, by the terminal, communication on a contention resource of the cell; and
when the terminal is in the second state, requesting, by the terminal, a contention-free resource of the cell from the network device.

3. The method according to claim 2, wherein receiving, by the terminal, a signal sent by the network device comprises:
receiving, by the terminal, terminal information broadcast by the network device; or
receiving, by the terminal, control signaling comprising the terminal information sent by the network device.

4. An information transmission apparatus for use in a wireless network comprising at least a network device and a terminal located in a cell of the network device, the apparatus comprising:
a memory; and
at least one processor coupled to the memory, the at least one processor configured to:
sending, by the network device, a signal to the terminal, wherein the signal comprises threshold information, wherein the terminal performs physical layer measurement, and obtains a physical layer parameter, wherein the physical layer parameter comprises at least one of references signal received quality (RSRQ) or reference signal received power (RSRP);
receiving, by the network device, a request for a contention resource from the terminal when the terminal is in a first state, wherein the terminal compares the physical layer parameter with a physical layer parameter threshold, to determine whether the terminal is uplink-limited and therefore in the first state;

when the terminal is in the first state, determine to not allocate a contention-free resource of the cell to the terminal, wherein no allocation of a contention-free resource causes the terminal to perform communication on a contention resource of the cell; and when the terminal is in the second state, control the network device to allocate a contention-free resource of the cell to the terminal, wherein the terminal is in the second state when the terminal is not uplink-limited.

* * * * *